(12) United States Patent
Kimura et al.

(10) Patent No.: US 7,515,523 B2
(45) Date of Patent: Apr. 7, 2009

(54) OPTICAL SYSTEM FOR OPTICAL PICKUP APPARATUS, OPTICAL PICKUP APPARATUS, OPTICAL INFORMATION RECORDING AND/OR REPRODUCING APPARATUS AND ABERRATION-CORRECTING ELEMENT FOR OPTICAL PICKUP APPARATUS

(75) Inventors: Tohru Kimura, Hachioji (JP); Nobuyoshi Mori, Hachioji (JP); Eiji Nomura, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 805 days.

(21) Appl. No.: 10/859,982

(22) Filed: Jun. 4, 2004

(65) Prior Publication Data

US 2004/0264349 A1    Dec. 30, 2004

(30) Foreign Application Priority Data

Jun. 9, 2003    (JP)    ............................. 2003-164214

(51) Int. Cl.
   *G11B 7/00*    (2006.01)
(52) U.S. Cl. .............................. 369/112.07; 369/112.23
(58) Field of Classification Search ........................ None
   See application file for complete search history.

(56) References Cited

U.S. PATENT DOCUMENTS

| 2001/0000134 A1 | 4/2001 | Yamanaka |
| 2002/0114259 A1 | 8/2002 | Shimano et al. |
| 2003/0081528 A1 | 5/2003 | Saito |
| 2003/0090801 A1 | 5/2003 | Kimura |

FOREIGN PATENT DOCUMENTS

| DE | 199 24 640 A1 | 12/1999 |
| EP | 0 840 144 A1 | 5/1998 |
| EP | 1 304 689 A2 | 4/2003 |
| EP | 1 313 095 | 5/2003 |

OTHER PUBLICATIONS

Madjidi-Zolbanine H. et al. "Holographic correction of both chromatic and spherical aberrations of single glass lenses", Applied Optics, vol. 18, No. 14, Jul. 15, 1979, pp. 2385-2393.
Tanaka Yasuhiro et al.. "Lens And Optics for Optical Disk System,", Japanese Journal of Applied Physics, vol. 26, 1987, pp. 121-126.
Komma Yoshiaki et al., "Dual Focus Optical Head with a Hologram-Integrated Lens", Japanese Journal of Applied Physics, vol. 36, Jan. 1997, pp. 474-480.
European International Search Report dated Sep. 10, 2008 (5 pages).

*Primary Examiner*—Paul Huber
(74) *Attorney, Agent, or Firm*—Finnegan, Henderson, Farabow, Garrett & Dunner, L.L.P.

(57) ABSTRACT

An optical system utilized in an optical pickup apparatus comprising: an aberration-correcting element made of a plastic material; and a converging lens to converge a light flux emitted from the aberration-correcting element, the converging lens being made of a plastic material, wherein the aberration-correcting element has a first optical surface provided thereon an optical path difference generating structure and has a second optical surface provided thereon a diffractive structure, and the converging lens is a single refractive lens having at least an aspherical surface.

12 Claims, 6 Drawing Sheets

FIG. 4 (a)
FIG. 4 (b)
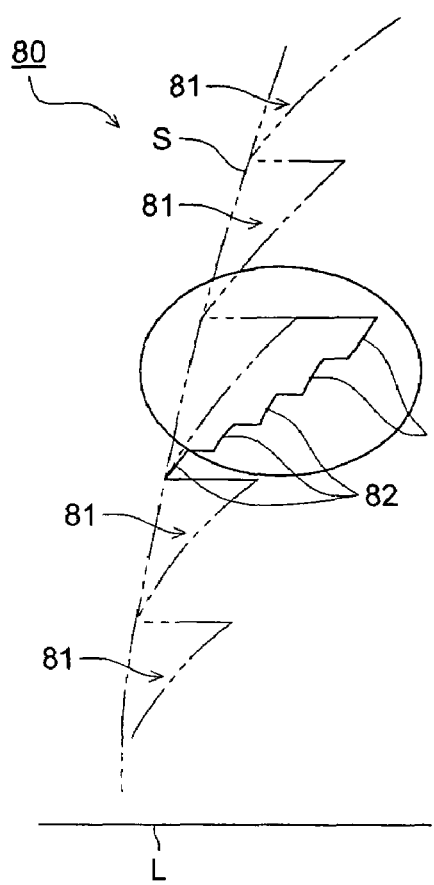
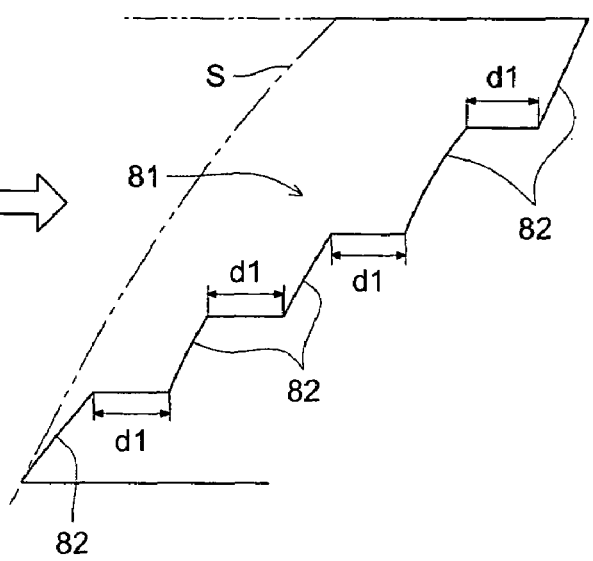

OPTICAL SYSTEM FOR OPTICAL PICKUP APPARATUS, OPTICAL PICKUP APPARATUS, OPTICAL INFORMATION RECORDING AND/OR REPRODUCING APPARATUS AND ABERRATION-CORRECTING ELEMENT FOR OPTICAL PICKUP APPARATUS

TECHNICAL FIELD

The present invention relates to an objective optical system for an optical pickup apparatus, an optical pickup apparatus, an optical information recording and/or reproducing apparatus and an aberration-correcting element for an optical pickup apparatus.

TECHNICAL BACKGROUND

Accompanying the recent trend to higher density of optical disks, there have come to be used the objective lenses which have higher numerical apertures (NA) and are incorporated in optical pickup apparatuses used in recording/reproducing for optical disks, for the demand for smaller convergent spots.

For example, in the optical pickup apparatus for high density optical disks using a violet semiconductor laser light source having wavelength λ of 405 nm, it has been suggested to use an objective lens having numerical aperture NA of 0.85, for attaining higher densities.

As an objective lens having a numerical aperture of 0.85, the Unexamined Patent Application Publication (hereinafter, referred to as JP-A) No. H10-123410 discloses a two-group lens made of glass wherein NA of 0.85 has been attained with relaxed manufacture tolerance for each lens, by making two lenses to share refracting power for an incident light flux.

However, in the case of injection molding for an aspherical lens made of glass, it is necessary to raise a temperature of a die to about 550° C., which causes a problem that a die for an aspherical lens made of glass is generally short in terms of its life, and it is not suitable for mass production.

Further, since a protective layer having a thickness of 0.1 mm is used in the high density optical disk using a laser light flux with wavelength 405 nm and an objective lens with NA 0.85, a scratch on the surface of the protective layer has a great influence on characteristics of recording/reproducing of information. Therefore, securing a working distance in design of the objective lens is extremely important for preventing that the objective lens interferes with the optical disk to scratch the surface of the protective layer.

However, in the case of an objective lens of a two-group construction, a height of a marginal beam from an optical axis is small in the case of passing through an optical surface facing the optical disk, and a distance (working distance) from the objective lens to the optical disk is short, because an incident light flux is converged on an information recording surface of an optical disk after being refracted by two lenses respectively, which makes the objective lens to interfere easily with the optical disk. In particular, on the objective lens of a two-group type made of glass which is described in the above patent application, a possibility for the objective lens to interfere with an optical disk and thereby to scratch the surface of the protective layer is extremely high, because a weight of the objective lens is great.

To deal with the aforesaid problem, therefore, one of the inventors of the invention proposed a plastic single lens having NA 0.85 that is like one described in JP-A No. 2001-324673.

Compared with a glass lens, a lens made of plastic can be subjected to injection molding at lower temperature (approximately 120° C.), and therefore, the expected life span of a die for the plastic lens is longer, and expenses of materials for the plastic lens are less expensive. Therefore, the plastic lenses can be manufactured on a mass production basis at low cost, while keeping stable quality. Further, owing to the structure of a single lens, a long working distance can be secured, and a problem of damage on the surface of a protective layer caused by an interference between an objective lens and an optical disk can be solved because of light weight.

Though the plastic single lens with NA 0.85 has the aforementioned advantageous point, in comparison with a glass lens of a two-group type, it has a problem that spherical aberration caused by changes in refractive index resulting from temperature changes grows greater. A basis for the foregoing is that changes in spherical aberration caused on a plastic single lens are increased in proportion to $NA^4$.

Incidentally, in the following explanation, characteristics of the optical element in the case of temperature changes are called "temperature characteristics", and correcting wavefront aberration changes of an optical element accompanying prescribed temperature changes so that the wavefront aberration changes may be not more than the diffraction limit is called "correction of temperature characteristics".

In the optical pickup apparatus, laser power for recording of information is generally greater than that for reproducing of information, which sometimes causes mode hopping which is a phenomenon that a central wavelength of a laser light source is made by changes in output to jump several microns instantaneously when reproducing is switched to recording. Though a deviation of a focus position caused by the mode hopping can be removed by focusing of an objective lens, troubles such as poor recording caused by the deviation of a focus position are raised for a period of several nanoseconds until focusing of the objective lens. Since this deviation of a focus position grows greater when a wavelength of a light source is shorter, deterioration of wavefront aberration caused by mode hopping grows greater when a wavelength of a light source is shorter. From the reasons stated above, correction of the deviation of a focus position of a convergent spot due to wavelength changes has been demanded, especially in the optical pickup apparatus for high-density optical disks employing a violet semiconductor laser as a light source.

Incidentally, in the following explanation, "chromatic aberration" means a longitudinal chromatic aberration and/or a variation in spherical aberration, which are generated on the optical element due to a fluctuation in wavelength of an incident light flux. Wavefront aberration is deteriorated when a focus position of a convergent spot formed by an optical element is deviated by the chromatic aberration of this kind. "Correction of chromatic aberration" means that "chromatic aberration" of the optical element caused by prescribed fluctuation in wavelength of the incident light flux is corrected to be a diffraction limit or less.

Since plastic materials capable of being used in a short wavelength area are limited, it is impossible to control this chromatic aberration to be small by selecting materials having large Abbe's number. Further, compared with a two-group type lens, in a single lens, an amount of occurrence of the chromatic aberration for the same wavelength change of the incident light flux tend to grow greater.

Namely, for using a plastic single lens with NA 0.85 as an objective lens of an optical pickup apparatus that employs a violet semiconductor laser as a light source, it is desirable to conduct "correction of chromatic aberration" as well as "correction of temperature characteristics".

As a technology to correct temperature characteristics of a plastic single lens, JP-A H11-337818 discloses a technology wherein there is formed, on an optical surface of the plastic single lens, a diffractive structure having wavelength-dependency of spherical aberration in which the spherical aberration changes in the direction toward insufficient correction when an incident light flux changes to be longer.

Further, International Publication Pamphlet No. 02/41307 discloses a technology wherein chromatic aberration and temperature characteristics are corrected by providing a diffractive structure and a structure of plural steps extending in the optical axis direction (NPS: non-periodic phase structure) on optical surfaces of the plastic single lens.

However, in the plastic single lens on which the diffractive structure described in JP-A No. H11-337818 is formed, spherical aberration changes toward excessive correction due to refractive index decline of the objective lens by temperature rise is cancelled and corrected by spherical aberration changes toward insufficient correction by a diffractive structure due to the change of wavelength of the incident light by the temperature rise.

Namely, since the aforementioned technology is one to utilize characteristics that oscillation wavelength of a semiconductor laser is shifted to the longer wavelength side when temperature rises, an effect of correction of temperature characteristics cannot be obtained in the situation where only temperature of an objective optical system arranged in the vicinity of an actuator that becomes a heat source during operations of the optical pickup apparatus rises, and temperature of a semiconductor laser arranged to be away from the actuator does not change substantially, which is a problem.

In contrast to the foregoing, the technology disclosed in the International Publication Pamphlet No. 02/41307 is one to use a diffractive structure for correcting chromatic aberration and to use NPS for correcting temperature characteristics. Therefore, even in the situation where only temperature of the objective optical system rises and the temperature of the semiconductor laser does not change substantially, an effect of correction of temperature characteristics can be obtained, which is an advantageous point. However, when a structure having microscopic steps in the optical axis direction such as a diffractive structure or NPS is formed on an optical surface of an objective optical system that requires large refracting power, a course of a light flux entering a side of the step is blocked (a light flux is eclipsed). Thus, the light flux does not contribute to forming of a convergent spot and causes a decline of an amount of light. In particular, in the plastic single lens with NA 0.85, the radius of curvature of the optical surface thereof is extremely small, and therefore, an improvement of a decline of an amount of light caused by eclipse of the light flux at the step in the optical axis direction in the diffractive structure or in NPS is demanded.

Further, since the change in the spherical aberration due to the temperature characteristics caused on a plastic single lens is increased in proportion to $NA^4$, it may be difficult to sufficiently conduct the correction of the spherical aberration of the temperature characteristics by only NPS when a lens having a very high NA, such as a single plastic lens having NA of 0.85, is used. Thus, further improvement in the efficiency of correction of the temperature characteristics has been still demanded.

SUMMARY OF THE INVENTION

An aspect of the invention is based on consideration of the aforementioned problems, and is to provide an optical system for an optical pickup apparatus wherein a weight is light and a sufficient working distance can be secured, and temperature characteristics and chromatic aberration can be corrected.

Another aspect of the present invention is to provide an optical system for an optical pickup apparatus, which is excellent especially in correction of temperature characteristics.

Still another aspect of the present invention is to provide an aberration-correcting element usable in the above-mentioned optical system and to provide an optical pickup apparatus utilizing the optical system and an optical information recording and/or reproducing apparatus utilizing the optical pickup apparatus.

At least one of the aforementioned aspects of the present invention can be achieved by the following embodiments.

A first embodiment is an optical system, which can be utilized in an optical pickup apparatus, comprising:

an aberration-correcting element being made of a plastic material, wherein the aberration-correcting element includes a first optical surface having an optical path difference generating structure on the first optical surface and includes a second optical surface having a diffractive structure on the second optical surface; and a converging lens to converge a light flux emitted from the aberration-correcting element, the converging lens being made of a plastic material, wherein the converging lens is a single refractive lens and has at least an aspherical surface.

In the first embodiment, it is possible to correct temperature characteristics with the optical path difference generating structure, even in the case where a wavelength of the emitted light flux is not changed, by using the diffractive structure for correcting chromatic aberration and by using the optical path difference generating structure for correcting temperature characteristics.

Since the aberration-correcting element and the converging lens are made of plastic materials, it is further possible to realize weight reduction of an objective optical system with high NA used for a high density optical disk, and to manufacture at low cost through injection molding employing a die.

It is further possible to minimize a rate of light fluxes whose courses are blocked and thereby do not contribute to forming of a convergent spot, among light fluxes entering the diffractive structure and the optical path difference generating structure, and it is possible to prevent a decline of an amount of light, because a structure having microscopic steps such as the diffractive structure or the optical path difference generating structure is formed on the optical surface of the aberration-correcting element rather than the converging lens.

A second embodiment is an optical system, which can be utilized in an optical pickup apparatus, comprising:

an aberration-correcting element made of a plastic material, wherein the aberration-correcting element includes an optical surface having thereon an optical path difference generating structure; and a converging lens to converge a light flux emitted from the aberration-correcting element, the converging lens being made of a plastic material, wherein the converging lens is a single refractive lens having at least an aspherical surface, wherein a paraxial power $P_1$ (mm$^{-1}$) of the aberration-correcting element satisfies the following formula (1).

$$P_1 > 0 \quad (1)$$

In the second embodiment, a light flux emerging from the aberration-correcting element results in a convergent light flux because the paraxial power $P_1$ (mm$^{-1}$) of the aberration-correcting element is greater than 0, which is equivalent to m>0 that is satisfied by a magnification of the converging lens. In general, numerical aperture NA $\infty$ (hereinafter referred to as conversion NA) obtained by conversion into infinite light flux incidence about a converging lens of a finite conjugate type having numerical aperture NA can be expressed by NA $\infty$=NA (1−m). In the converging lens whose magnification m satisfies m>0, it is possible to make a change of spherical aberration caused by temperature characteristics of the converging lens that increases in proportion to NA$^4$, because the conversion NA can be made small.

A third embodiment is an aberration-correcting element, which can be utilized in an optical pickup apparatus by positioned on a optical path between a laser light source and a converging lens, the converging lens converging a light flux emitted by the light source onto an optical information recording surface of an optical disk, the converging lens being opposed to the optical disk, wherein the aberration-correcting element is made of a plastic material, the aberration-correcting element includes a first optical surface having thereon an optical path difference generating structure and includes a second optical surface having thereon a diffractive structure, and the first optical surface and the second optical surface are different optical surfaces.

In the third embodiment, temperature characteristics can be corrected by an optical path difference generating structure, even in the case where a refractive index only is changed by changes of ambient temperature, and a wavelength of the emitted light flux remains unchanged, by using the diffractive structure for correction of chromatic aberration and using an optical path difference generating structure for correcting temperature characteristics.

Further, since the aberration-correcting element is made of plastic, it is possible to realize weight reduction of an objective optical system with high NA used for a high density optical disk and to manufacture them at low cost through injection molding employing a die.

It is further possible to minimize a rate of light fluxes whose courses are blocked and thereby do not contribute to forming of a convergent spot, among light fluxes entering the diffractive structure and the optical path difference generating structure, and it is possible to prevent a decline of an amount of light, because a structure having microscopic steps such as the diffractive structure or the optical path difference generating structure is formed on the optical surface of the aberration-correcting element.

A fourth embodiment is an optical pickup apparatus comprising:

a laser light source;

the optical system according to the first or second embodiment, the optical system converging a light flux emitted by the laser light source onto an information recording surface of an optical disk; and a photo detector to detect a light flux reflected by the information recording surface of the optical disk.

A fifth embodiment is an optical information recording and/or reproducing apparatus comprising:

the optical pickup apparatus according to the fourth embodiment; and a supporting member to support the optical disk so as to positioning the optical disk at a predetermined position, wherein the optical information recording and/or reproducing apparatus can conduct at least one of recording information to the optical disk and reproducing information from the optical disk.

BRIEF DESCRIPTION OF DRAWINGS

FIG. 4(a) is a cross sectional view for primary portions and FIG. 4(b) is an enlarged diagram both showing a diffractive structure.

THE EXEMPLIFIED EMBODIMENTS OF THE INVENTION

Figure 1:
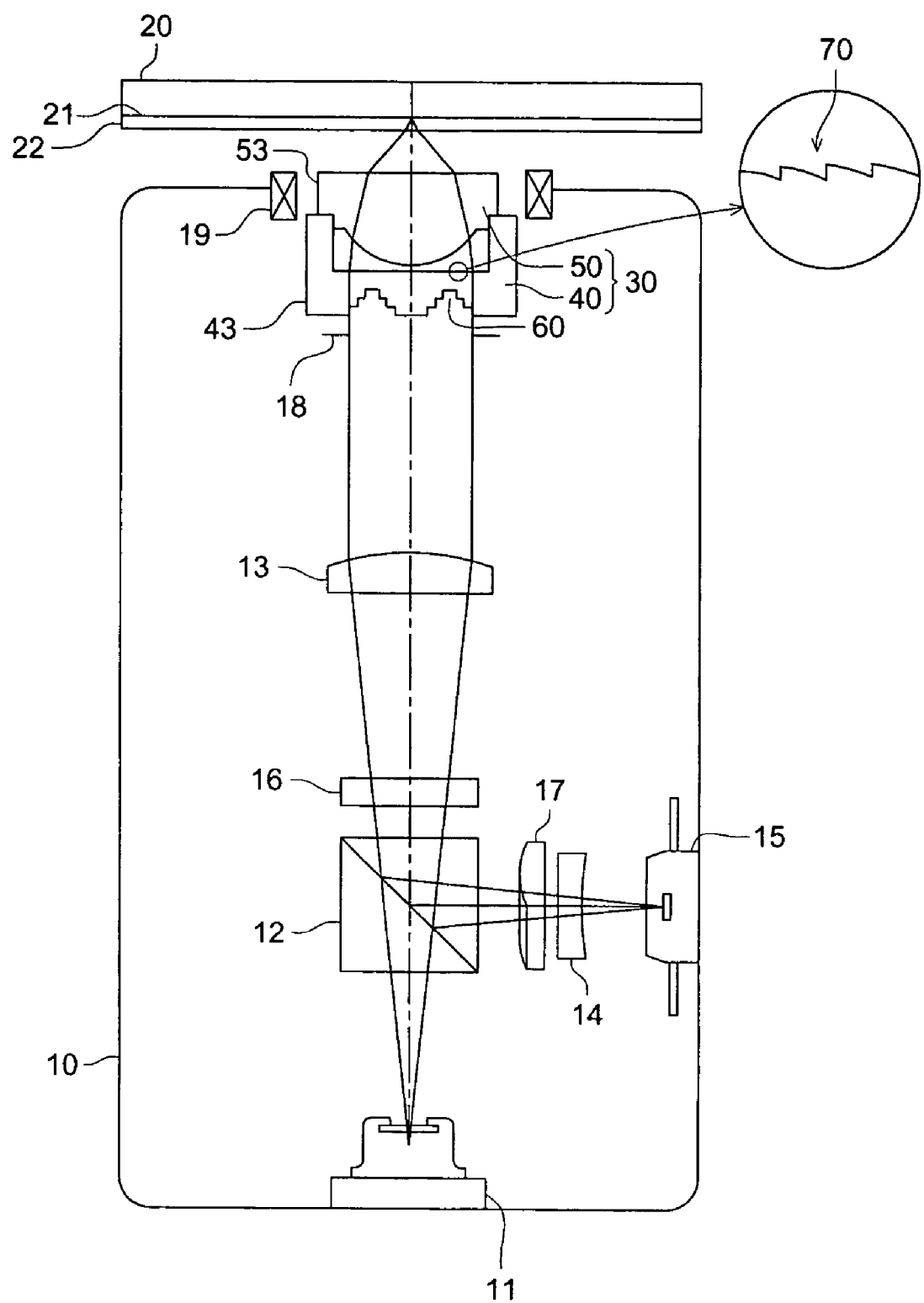
FIG. 1 is a cross sectional view for primary portions showing the structure of the optical pickup apparatus.

Incidentally, in the present specification, optical disks using a violet semiconductor laser as a light source for recording/reproducing of information are called "high density optical disk" generically, and in addition to the optical disk having the standard that an objective optical system with NA 0.85 is used for recording/reproducing of information, and a thickness of a protective layer is about 0.1 mm, an optical disk having the standard that an objective optical system with NA 0.65 is used for recording/reproducing of information and a thickness of a protective layer is about 0.6 mm is also assumed to be included in the high density optical disk. Further, in addition to the optical disk having, on its information recording surface, the protective layer, an optical disk having a protective film with a thickness of several—several tens nanometers on an information recording surface, and an optical disk on which a thickness of a protective layer or a protective film is 0 are also assumed to be included in the high density optical disk. Further, in the present specification, a magneto-optical disk using a violet semiconductor laser as a light source for recording/reproducing of information is also assumed to be included in the high density optical disk. The embodiments of the present invention is preferably used for recording optical information onto and/or reproducing optical information from such the high density optical disk, however, the optical disk usable in the present invention is not limited.

In the present specification, "aberration-correcting element" means an optical element having a function to control wavefront aberration changes caused by temperature characteristics and/or chromatic aberration of another optical element accompanying ambient temperature changes or wavelength changes of an incident light flux, while, "converging lens" means an optical element having a function to converge a light flux emerging from the "aberration-correcting element" for image formation. Namely, the "aberration-correcting element" controls wavefront aberration changes caused by temperature characteristics and/or chromatic aberration of the "converging lens" accompanying ambient temperature changes or wavelength changes of an incident light flux.

When using the optical system composed of the "aberration-correcting element" and the "converging lens" as an objective lens (referred to as objective optical system) in the optical pickup apparatus, the "aberration-correcting element" is arranged to be close to the laser light source, and the "converging lens" is arranged to be close to an optical disk.

In the present specification, the "optical path difference generating structure" is a structure composed of a central region including an optical axis and an outer region at the outside of the central region, and the outer region including plural ring-shaped zones to be divided by microscopic steps, and it is a structure having characteristics wherein, at the prescribed temperature, the optical path difference which is equivalent in terms of a length to a multiple of an integer of a wavelength of the incident light flux between wavefronts passing through adjoining ring-shaped zones, and the optical path difference generated between wavefronts passing through adjoining ring-shaped zones is deviated from a multiple of an integer of a wavelength of the incident light flux in the case of refractive index changes when a temperature is changed from the prescribed temperature.

By that structure, temperature characteristics can be corrected effectively by using an optical path difference generating structure for correcting temperature characteristics, even in the case where a refractive index of is changed by changes of ambient temperature, and a wavelength of the incident light flux remains unchanged.

A preferable structure of this "optical path difference generating structure" is one having a central region including an optical axis of the aberration-correcting element and has an outer region at the outer side of the central region, the outer region including a plurality of ring-shaped zones divided by steps, and in a first area of the outer region corresponding to a area from a periphery of the central region to a position of approximately 75% of a maximum effective diameter of the aberration-correcting element from the optical axis, an $(i+1)^{th}$ ring-shaped zone from the optical axis side is displaced in a direction parallel to the optical axis so that an optical path length of the $i+1)^{th}$ ring-shaped zone becomes shorter than an optical path length of an $i^{th}$ ring-shaped zone, i represents an integer; in a second area of the outer region corresponding to a area from the position of approximately 75% of the maximum effective diameter to the maximum effective diameter, a $(j+1)^{th}$ ring-shaped zone from the optical axis side is displaced in a direction parallel to the optical axis so that an optical path length of the $(j+1)^{th}$ ring-shaped zone is longer than an optical path length of a $j^{th}$ ring-shaped zone, j represents an integer; and an optical path length of a ring-shaped zone at the position of approximately 75% of the maximum effective diameter from the optical axis is shorter than each of optical path lengths of ring-shaped zone adjoining the ring-shaped zone at the point of approximately 75% of the maximum effective diameter from the optical axis.

In this case, the "central region" means an optical area which includes an optical axis and is surrounded by the step that is closest to the optical axis.

In the present specification, "diffractive structure" is a structure composed of a central region including the optical axis and of an outer region at the outer side of the central region, the outer region including plural ring-shaped zones to be divided by microscopic steps, and it is a structure having characteristics wherein, when an incident light flux has a prescribed wavelength, an optical path difference equivalent to a multiple of an integer of a wavelength of the incident light flux is generated by diffracting actions between wavefronts passing through adjoining ring-shaped zones, and when a wavelength of the incident light flux is changed from the prescribed wavelength, the optical path difference generated between wavefronts passing through adjoining ring-shaped zones is deviated from a multiple of an integer of a wavelength of the incident light flux.

The preferable structure of the "diffractive structure" is in a form of stairs that is displaced in the optical axis direction so that an optical path length may become longer as a position of the optical path is farther from the optical axis, or the preferable structure is a structure whose sectional view including the optical axis is in a form of saw-tooth.

In the optical system of the above-described first embodiment, it is preferable that the first optical surface and the second optical surface are the same optical surface.

In the optical system of the above-described first embodiment, it is also preferable that the first optical surface and the second optical surface are different optical surfaces.

In the optical system of the above-described first embodiment, it is preferable that the diffractive structure is formed on the optical surface of the aberration-correcting element closer to the converging lens.

By that structure, the diffractive structure is formed on the side of the converging lens on the aberration-correcting element, namely, the diffractive structure is formed on the side of the surface of emergence on the aberration-correcting element. In this case, the incident light flux entering the aberration-correcting element is subjected to diffraction actions in the diffractive structure, and thereby, the course of the light flux is changed to be closer to the optical axis to advance. Therefore, when the light flux subjected to diffraction actions at the plane of incidence of the aberration-correcting element is compared with the light flux subjected to diffraction actions at the plane of emergence, the light flux subjected to diffraction actions at the plane of emergence emerges from the position that is farther from the optical axis, and even in the case of emerging from the plane of emergence of the converging lens, the light flux subjected to diffraction actions at the plane of emergence of the aberration-correcting element emerges from the position that is farther from the optical axis. Due to this, it is possible to make the distance from the plane of emergence of the converging lens to the surface of an optical disk (working distance) to be longer, which makes it possible in advance to prevent that the surface of an optical disk interferes with the plane of emergence of the objective lens in the course of driving the optical pickup apparatus.

In the optical system of the first embodiment, it is preferable that the optical path difference generating structure is formed on the optical surface of the aberration-correcting element on which paraxial refracting power is 0.

By that structure, the optical path difference generating structure is formed on a flat surface, and therefore, it is possible to minimize a rate of light fluxes whose courses are blocked and thereby do not contribute to forming of a convergent spot, among light fluxes entering the optical path difference generating structure and thereby to prevent a decline of an amount of light, compared with an occasion where the optical path difference generating structure is formed on a spherical surface.

In the optical system of the first embodiment, it is preferable that the diffractive structure is formed on the optical surface of the aberration-correcting element whose paraxial refracting power is 0.

By that structure, the diffractive structure is formed on a flat surface, and therefore, it is possible to minimize a rate of light fluxes whose courses are blocked and thereby do not contribute to forming of a convergent spot, among light fluxes entering the diffractive and thereby to prevent a decline of an amount of light, compared with an occasion where the diffractive structure is formed on a spherical surface.

In the optical system of the above-described second embodiment, it is preferable that the paraxial refracting power $P_R$ (mm$^{-1}$) of the aberration-correcting element satisfies the following expression (2).

$$P_R > 0 \qquad (2)$$

By that structure, a light flux subjected to the refracting power emerges from the aberration-correcting element as convergent light, because the paraxial refracting power $P_R$ (mm$^{-1}$) of the aberration-correcting element is greater than 0.

When the refractive index of the aberration-correcting element is lowered by a rise in ambient temperature, a degree of convergence of a light flux emerging from the aberration-correcting element turns out to be smaller, compared with that before a decline of the refractive index, because refracting power of the aberration-correcting element becomes smaller. Since this is equivalent to a change of the magnification of the converging lens in the direction to become smaller caused by a rise of ambient temperature, this magnification change causes spherical aberration to be changed in the direction of insufficient correction on the converging lens. It is therefore possible to offset spherical aberration that is changed in the direction to the excessive correction by a fall of the refractive index of the converging lens caused by a rise of ambient temperature.

As explained above, by that structure, an amount of correction of temperature characteristics of the converging lens by the optical path difference generating structure can be reduced, and thereby, the number of ring-shaped zones can be reduced greatly, and a width of a ring-shaped zone in the direction perpendicular to the optical axis can be made large, resulting in the effect that time required for making a die can be reduced, and transferability of the optical path difference generating structure onto a plastic material in the course of injection molding can be improved.

In the optical system of the second embodiment, it is preferable that the aberration-correcting element has at least one optical surface on which a diffractive structure is formed.

In the optical system in the invention, it is preferable that the diffractive structure corrects at least a longitudinal chromatic aberration generated on the converging lens due to wavelength fluctuation of the incident light flux.

It is further preferable that when an optical path difference added to wavefront passing through the diffractive structure is expressed by optical path difference function $\Phi_b$ (mm) defined by $\Phi_b = b_2 \cdot h^2 + b_4 \cdot h^4 + b_6 \cdot h^6 + \ldots$, paraxial diffracting power $P_D$ (mm$^{-1}$) defined by $P_D = -2 \cdot b_2$ and paraxial combined power $P_T$ (mm$^{-1}$) obtained through combination of the aberration-correcting element and converging lens satisfy the following expression (3);

$$0.03 \leq P_D/P_T \leq 0.15 \qquad (3)$$

wherein h represents a height (mm) from the optical axis, and each of $b_2, b_4, b_6, \ldots$ represents a coefficient of optical path difference function for each of $2^{nd}$ order, $4^{th}$ order, $6^{th}$ order.

In the optical system of the present invention, it is preferable that the diffractive structure corrects a variation in a spherical aberration generated on the converging lens due to wavelength fluctuation of the incident light flux.

It is further preferable that when an optical path difference added to wavefront passing through the diffractive structure is expressed by optical path difference function $\Phi_b$ (mm) defined by $\Phi_b = b_2 \cdot h^2 + b_4 \cdot h^4 + b_6 \cdot h^6 + \ldots$, at least one coefficient of optical path difference function other than the $2^{nd}$ order becomes 0.

Incidentally, h represents a height (mm) from the optical axis, and each of $b_2, b_4, b_6, \ldots$ represents a coefficient of optical path difference function for each of $2^{nd}$ order, $4^{th}$ order, $6^{th}$ order.

Further, it is preferable that the diffractive structure is composed of a central region including an optical axis and of plural ring-shaped zones formed on an outer side of the central region to be divided by microscopic steps, and width $P_f$ (mm) of the ring-shaped zones at the maximum effective diameter position and width $P_h$ (mm) of the ring-shaped zones at the position of 50% of the maximum effective diameter satisfy the following expression (4).

$$0 < |P_h/P_f - 2| < 5 \qquad (4)$$

In the optical system of the present invention, it is preferable that the diffractive structure is composed of a central region including an optical axis and of plural ring-shaped zones formed on an outer side of the central region to be divided by microscopic steps, and a section of the ring-shaped zones including an optical axis are in a form of stairs.

In the optical system of the present invention, it is also preferable that the diffractive structure is composed of a central region including an optical axis and of plural ring-shaped zones formed on an outer side of the central region to be divided by microscopic steps, and a section of the ring-shaped zones including an optical axis are in a form of saw-tooth.

In the optical system of the present invention, it is preferable that the following expressions (5) and (6) are satisfied when λ (nm) represents a wavelength of a laser light source of the optical pickup apparatus in which the objective optical system is housed, and NA represents a numerical aperture obtained by combining the aberration-correcting element and the converging lens.

$$\lambda \leq 450 \text{ nm} \qquad (5)$$

$$0.60 \leq NA \leq 0.95 \qquad (6)$$

Further, in the optical system of the present invention, it is more preferable that the following expressions (9) and (10) are satisfied when NA represents the numeral aperture as described above, and f (mm) represents a focal length of the optical system.

$$0.75 \leq NA23 \, 0.90 \qquad (9)$$

$$0.7 < f < 2.5 \qquad (10)$$

In the optical system of the present invention, it is preferable that the aberration-correcting element and the converging lens are designed so that aberration of each of them can be evaluated independently.

In the optical system of the present invention, it is preferable that each of the aberration-correcting element and the converging lens has an optical functional portion and a flange portion formed around the outer side of the optical functional portion, and at least a part of the flange portion of the converging lens and a part of the flange portion of the aberration-correcting element are bonded each other.

In the optical system of the present invention, it is preferable that the aberration-correcting element and the converging lens are bonded each other with utilizing a bonding member.

In the aberration-correcting element of the above-described third embodiment, it is preferable that the diffractive structure corrects at least a longitudinal chromatic aberration generated on the converging lens due to wavelength fluctuation of the incident light flux.

It is further preferable that paraxial power $P_M$ (mm$^{-1}$) of the aberration-correcting element for a prescribed wavelength of 450 nm or less, paraxial power $P_L$ (mm$^{-1}$) of the aberration-correcting element for a wavelength that is longer than the prescribed wavelength by 10 nm and paraxial power $P_s$ (mm$^{-1}$) of the aberration-correcting element for a wavelength that is shorter than the prescribed wavelength by 10 nm satisfy the following expression.

$$P_S < P_M < P_L \tag{7}$$

In the aberration-correcting element of the third embodiment, the diffractive structure corrects at least a variation in a spherical aberration generated on the converging lens due to a wavelength fluctuation of the incident light flux.

It is further preferable that when an optical path difference added to wavefront passing through the diffractive structure is expressed by optical path difference function $\Phi_b$ (mm) defined by $\Phi_b = b_2 \cdot h^2 + b_4 \cdot h^4 + b_6 \cdot h^6 + \ldots$, at least one coefficient of optical path difference function other than the $2^{nd}$ order has a value that is not 0.

Incidentally, h represents a height (mm) from the optical axis, and each of $b_2$, $b_4$, $b_6$, . . . represents a coefficient of optical path difference function for each of $2^{nd}$ order, $4^{th}$ order, $6^{th}$ order.

Further, it is preferable that the diffractive structure is composed of a central region including an optical axis and of plural ring-shaped zones formed on an outer side of the central region to be divided by microscopic steps, and width Pf (mm) of the ring-shaped zones at the maximum effective diameter position and width Ph (mm) of the ring-shaped zones at the position of 50% of the maximum effective diameter satisfy the following expression (8).

$$0 < |P_H/P_f - 2| < 5 \tag{8}$$

In the aberration-correcting element of the third embodiment, it is preferable that the optical surface on which the optical path difference generating structure is formed is an optical surface closer to the laser light source, while, the optical surface on which the diffractive structure is formed is an optical surface closer to the converging lens.

In the aberration-correcting element of the third embodiment, it is preferable that the optical path difference generating structure is formed on an optical surface where paraxial refracting power of the aberration-correcting element is 0.

By that structure, the optical path difference generating structure is formed on the flat surface, and therefore, when compared with an occasion where the optical path difference generating structure is formed on an aspheric surface, it is possible to minimize a rate of light fluxes whose courses are blocked and thereby do not contribute to forming of a convergent spot, among light fluxes entering the optical path difference generating structure, and to prevent a decline of an amount of light.

In the aberration-correcting element of the third embodiment, it is preferable that the diffractive structure is formed on an optical surface where paraxial refracting power of the aberration-correcting element is 0.

By that structure, the diffractive structure is formed on the flat surface, and therefore, when compared with an occasion where the diffractive structure is formed on the spherical surface, it is possible to minimize a rate of light fluxes whose courses are blocked and thereby do not contribute to forming of a convergent spot, among light fluxes entering the diffractive structure, and to prevent a decline of an amount of light.

In the aberration-correcting element of the third embodiment, it is preferable that the diffractive structure is composed of a central region including an optical axis and of plural ring-shaped zones formed on an outer side of the central region to be divided by microscopic steps, and a shape of cross section of the diffractive structure including an optical axis are in a form of stairs.

In the aberration-correcting element of the third embodiment, it is also preferable that the diffractive structure is composed of a central region including an optical axis and of plural ring-shaped zones formed on an outer side of the central region to be divided by microscopic steps, and a shape of cross section the diffractive structure including the optical axis is in a form of saw-tooth.

Another embodiment of the present invention is optical element, which can be utilized in an optical pickup apparatus, comprising:

an aberration-correcting element made of a plastic material; and a converging lens to converge a light flux emitted from the aberration-correcting element, the converging lens being made of a plastic material, wherein the aberration-correcting element has at least one optical surface on which a diffractive structure is formed, and the converging lens is a single lens of a one-group one-element type that has at least one optical surface on which an optical path difference generating structure is formed and at least one aspheric surface.

In that structure, a diffractive structure for diffracting an incident light flux is formed on the aberration-correcting element, and an optical path difference generating structure is formed on the converging lens.

In this case, though changes in ambient temperatures cause spherical aberration to be generated on a light flux passing through the optical path difference generating structure, when the aberration-correcting element and the converging lens are incorporated under the state that their axes are deviated, the light flux enters the converging lens under the condition that spherical aberration is generated on the light flux, and coma is generated on the convergent spot by the light flux emerging from the converging lens.

Therefore, it is possible to prevent occurrence of the coma by forming an optical path difference generating structure on the converging lens, even when the aberration-correcting element and the converging lens are incorporated under the state that their axes are deviated.

The converging lens, which is preferably used in the present invention, is a plastic converging lens for converging a convergent light flux emitted from a convergent light flux generating member that converts a light flux emitted from a laser light source into a convergent light flux. It is further preferable that the following expressions (9)-(11) are satisfied when m represents a magnification in the case where the wavefront aberration within a diffraction limit becomes minimum, d (mm) represents a lens thickness on the optical axis, f (mm) represents a focal length and NA represents a numerical aperture, and the converging lens is a single lens of a one-group one-element structure type having at least one aspheric surface.

$$0 < m < 1 \tag{9}$$

$$0.75 < d/f < 1.5 \tag{10}$$

$$0.75 \leq NA \leq 0.95 \tag{11}$$

In that structure, it is further preferable that the convergent light flux-generating member is the aberration-correcting element described in the third embodiment.

Plastic materials to make the converging lens and the aberration-correcting element in the present invention are not limited as long as the plastic materials satisfy performances, which is required as an optical element for the optical pickup apparatus, in such as a transmittance, a thermostability, a low water-absorption, a birefringence property, a light fastness. Further, it is preferable that the plastic material used in the invention is excellent in a light fastness especially for a light having a short wavelength such as a blue violet laser having a wavelength of 405 nm.

The chemical construction of the plastic material used in the invention is not also limited. However, in the viewpoint of achieving the above-described performance, polymers or copolymers having an alicyclic hydrocarbon structure in its repeating unit. Among the polymers or the co-polymers, a hydride of a norbornene series ring-opening polymerization polymer, a hydride of a norbornene-a-olefin co-polymer and a hydride of a styrene-butadiene block co-polymer are more preferred. In the viewpoint of the light fastness for the light having short wavelength such as a blue violet laser, the hydride of a styrene-butadiene block co-polymer is still more preferred. Specifically, the hydrides described in JP-A No. 2002-148401 are most preferred.

Preferable concrete embodiments of the invention will be explained as follows, referring to the drawings.

FIG. 1 is a schematic diagram of optical pickup apparatus 10 in the present embodiment, and the optical pickup apparatus 10 is composed of blue violet semiconductor laser 11 serving as a light source, polarized beam splitter 12, quarter-wavelength plate 16, collimator 13, diaphragm 18, objective optical system 30, biaxial actuator 19 for focusing/tracking, cylindrical lens 17, concave lens 14 and photo detector 15.

A divergent light flux emitted from the violet semiconductor laser 11 is transmitted through the polarized beam splitter 12 and passes through the quarter-wavelength plate 16 and the collimator 13 to become a parallel light flux of circularly polarized light, then, it is regulated by the diaphragm 18 in terms of a light flux diameter to become a spot formed by objective optical system 30 on information recording surface 21 of high density optical disk 20 through protective layer 22.

A reflected light flux modulated by information pits on the information recording surface 21 passes again through objective optical system 30, diaphragm 18 and collimator lens 13 to become a convergent light flux, then, is transmitted through quarter-wavelength plate 16 to become linearly-polarized light and is reflected by the polarized beam splitter 12, and passes through cylindrical lens 17 and concave lens 14 to be given coma, and is converged on photo detector 15. Thus, information recorded on high density optical disk 20 can be read by using output signals of the photo detector 15.

Though objective optical system 30 is of an infinite conjugated type that converges a parallel light flux coming from collimator lens 13 on information recording surface 21 of high density optical disk 20 in the present embodiment, the objective optical system 30 may also be of a finite conjugated type that converges a divergent light flux coming from violet semiconductor laser 11 on information recording surface 21 of high density optical disk 20.

The objective optical system 30 has a function to converge a laser beam emitted from violet semiconductor laser 11 on information recording surface 21 through protective layer 22 of high density optical disk 20 (for example, a blue ray disk), and is composed of plastic aberration-correcting element 40 arranged to be closer to violet semiconductor laser 11 and of plastic converging lens 50 arranged to be closer to high density optical disk 20. NA obtained by combining aberration-correcting element 40 and converging lens 50 is 0.85.

Further, aberration-correcting element 40 and converging lens 50 have respectively flange portion 43 and flange portion 53 each being formed solidly with each optical function portion on a portion outside each optical function portion (an area through which a light flux from violet semiconductor laser 11 passes), and the aberration-correcting element 40 and the converging lens 50 are integrated solidly for conducting focusing and tracking.

Figure 2:
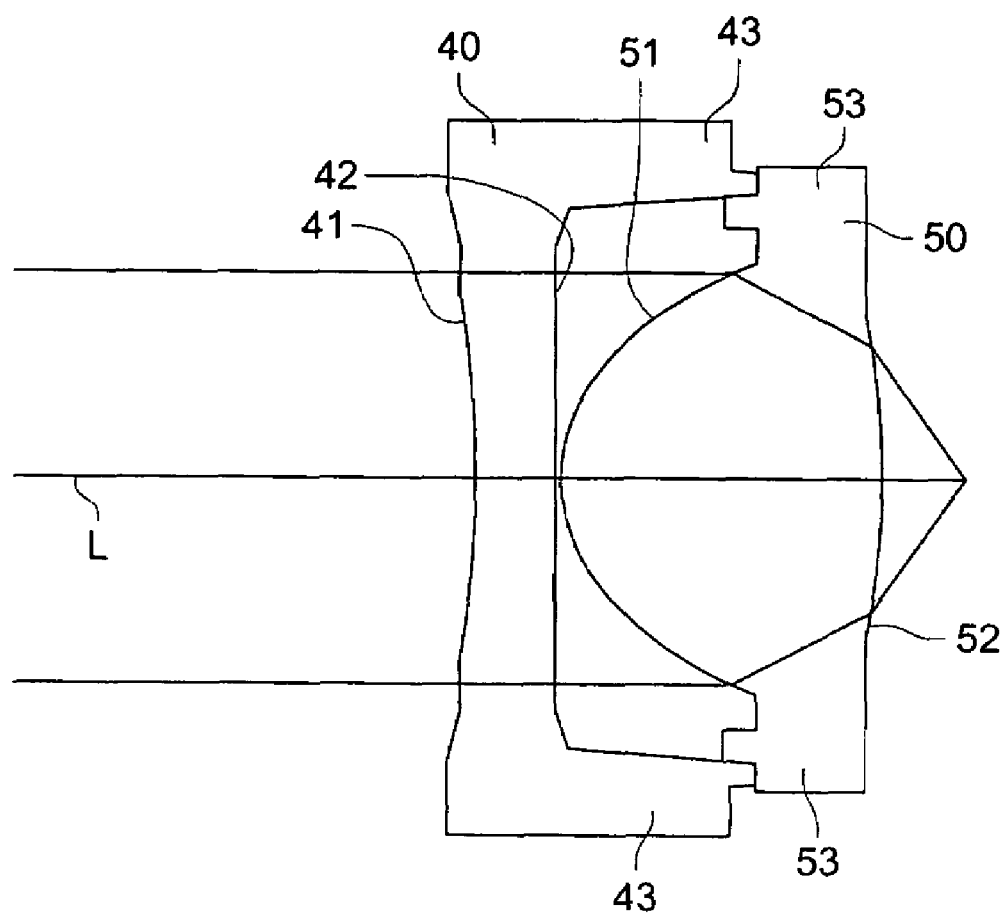
FIG. 2 is a cross sectional view for primary portions showing the structure of the objective optical system.

As shown in FIG. 2, objective optical system 30 is composed of plastic aberration-correcting element 40 and plastic converging lens 50 both arranged in this order from an object.

The converging lens 50 is a refracting single lens of a one-group one-element type having at least one aspheric surface (two faces including plane of incidence 51 and plane of emergence 52, in the present embodiment).

Figure 3:
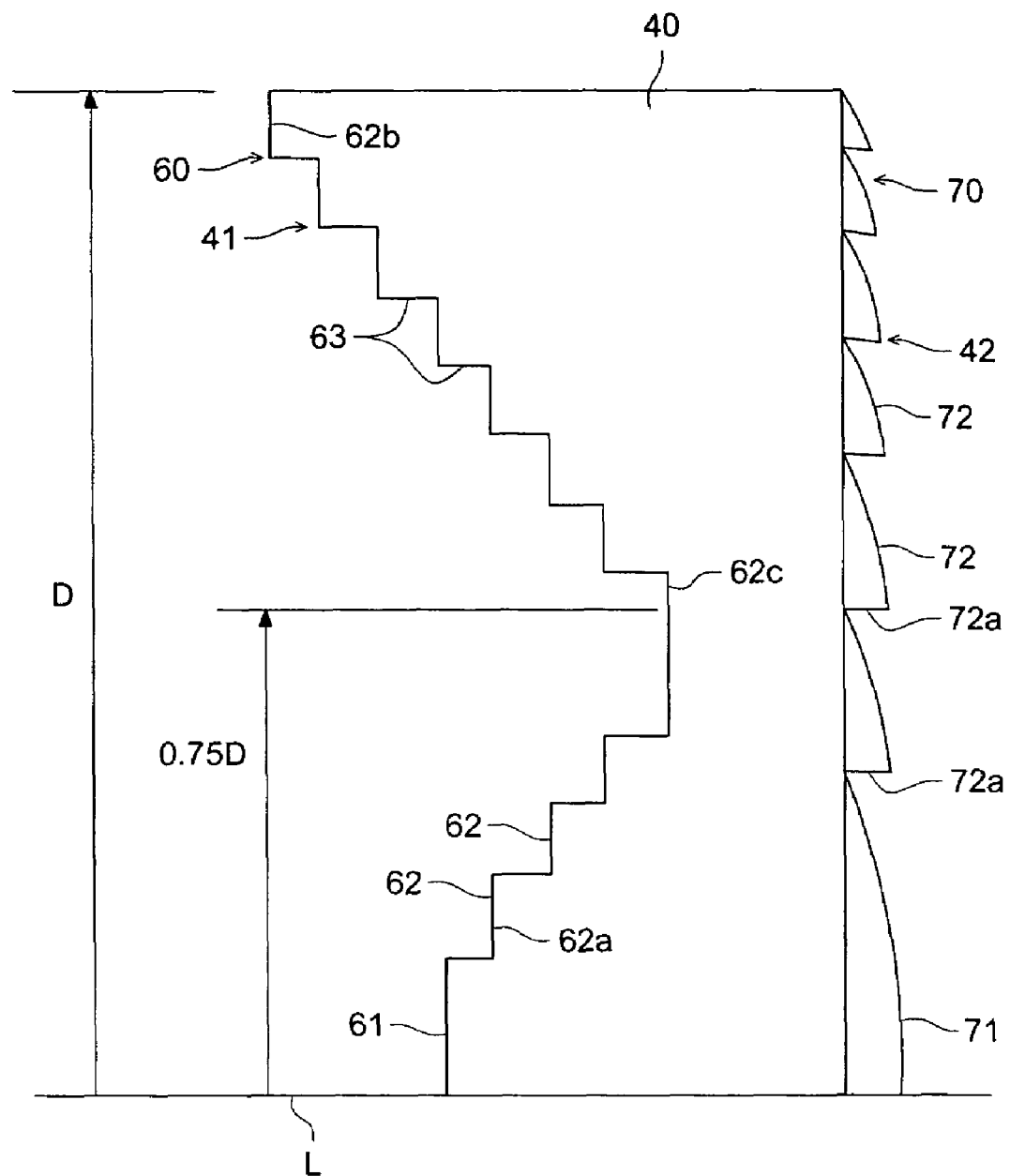
FIG. 3 is a cross sectional view for primary portions of an aberration-correcting element.

The aberration-correcting element 40 is an optical element of the so-called parallel flat plate wherein a form in the vicinity of the optical axis on its optical surface (plane of incidence and plane of emergence) is made to be flat, as shown in FIG. 3, and optical path difference structure 60 is formed on plane of incidence 41, and diffractive structure 70 is formed on the plane of emergence 42.

As shown in FIG. 3, optical path difference generating structure 60 is composed of central region 61 representing a plane surface that includes optical axis L and is perpendicular to optical axis L and of plural ring-shaped zones 62 which are formed outside the central region 61.

Each ring-shaped zone 62 is formed to be in a form of concentric circles whose centers are on the optical axis L, and its inner fringe portion and outer fringe portion are divided by microscopic step 63 extending in the direction of optical axis L.

Among plural ring-shaped zones 62, a ring-shaped zone (ring-shaped zone 62a) adjoining an outer side of the central region 61 is formed so that an optical path length may be shorter for the central region 61, in other words, it is formed to be closer to optical disk 20 along the direction of optical axis L, a ring-shaped zone (ring-shaped zone 62b) at the position corresponding to maximum effective diameter D of the optical surface is formed so that an optical path length may be longer for the central region 62 adjoining the inner side, in other words, it is formed to be closer to light source 11 along the direction of optical axis L, and a ring-shaped zone (ring-shaped zone 62c) at the position corresponding to 75% of the maximum effective diameter D is formed to be closer to optical disk 20 along the direction of optical axis L so that an optical path length may be shorter for the ring-shaped zone 62 adjoining the inner side and the ring-shaped zone 62 adjoining the outer side.

At plane of incidence 41 of aberration-correcting element 40, a light flux emitted from light source 11 is given an optical path difference corresponding to an amount of displacement of ring-shaped zone 62 (a length in the direction of optical axis L of ring-shaped zone 63) when the light flux passes through each ring-shaped zone 62, so that a phase difference may be generated on each light flux.

In the state where ambient temperatures are not changed, an optical path difference is given to each light flux so that a phase of the light flux which has passed through each ring-shaped zone 62 may be aligned substantially on information recording surface 21, and when ambient temperature rises, an optical path difference that changes spherical aberration of transmitted wavefront in the direction of insufficient correction is generated between the adjoining ring-shaped zones, thus, spherical aberration changes in the direction of excessive correction generated on converging lens 50 are corrected.

Diffractive structure 70 is composed of central region 71 including optical axis L and of plural ring-shaped zones (diffractive ring-shaped zones 72) formed outside the central region 71 to be divided with microscopic steps 72a in the direction of optical axis L, and a section of the ring-shaped zones including an optical axis is in a serrated form.

The invention described in Item 14 is the optical element of an optical pickup apparatus described in Item 13 wherein, when an optical path difference added to wavefront passing through the diffractive structure 70 is expressed by optical path difference function $\Phi_b$ (mm) defined by $\Phi_b = b_2 \cdot h^2 + b_4 \cdot h^4 + b_6 \cdot h^6 + \ldots$, paraxial diffracting power $P_D$ (mm$^{-1}$) defined by $P_D = -2 \cdot b_2$ and paraxial combined power $P_T$ (mm$^{-1}$) obtained through combination of the aberration-correcting element 40 and converging lens 50 satisfy the following expression (3), and thereby the diffractive structure 70 corrects longitudinal chromatic aberration generated on the converging lens 50 by changes in a wavelength of an incident light flux;

$$0.03 \leq P_D/P_T \leq 0.15 \quad (3)$$

wherein h represents a height (mm) from the optical axis L, and each of $b_2, b_4, b_6, \ldots$ represents a coefficient of optical path difference function for each of $2^{nd}$ order, $4^{th}$ order, $6^{th}$ order . . . .

Owing to an arrangement that at least one optical path difference function coefficient other than the $2^{nd}$ order has a nonzero value, the diffractive structure 70 corrects spherical aberration changes generated on the converging lens 50 following upon wavelength fluctuation of the incident light flux.

The diffractive structure 70 is designed so that the following expression (4) is satisfied by width $P_f$ (mm) of the ring-shaped zones 62 at the position of maximum effective diameter D in the direction perpendicular to optical axis L and by width $P_h$ (mm) of the ring-shaped zones 62 at the position of 50% of the maximum effective diameter D in the direction perpendicular to the optical axis L $$0 < |P_h/P_f - 2| < 5 \quad (4)$$

Further, aberration-correcting element 40 is designed so that expression (1) is satisfied by paraxial power $P_1$ (mm$^{-1}$) and expression (2) is satisfied by paraxial refracting power $P_R$ (mm$^{-1}$) of the aberration-correcting element 40.

$$P_1 > 0 \quad (1)$$

$$P_R > 0 \quad (2)$$

A light flux emerging from the aberration-correcting element results in a convergent light flux, because the paraxial power $P_1$ (mm$^{-1}$) of the aberration-correcting element is greater than 0, which is equivalent to m>0 for a magnification of the converging lens. In general, numerical aperture NA ∞ (hereinafter referred to as conversion NA) obtained by conversion into infinite light flux incidence about a converging lens of a finite conjugate type (m≠0) having numerical aperture NA can be expressed by NA ∞=NA·(1−m). In the converging lens whose magnification m satisfies m>0, it is possible to make a change of spherical aberration caused by temperature characteristics of the converging lens that increases in proportion to NA$^4$ to become smaller, because the conversion NA can be made small.

Further, since the paraxial refracting power $P_R$ (mm$^{-1}$) of the aberration-correcting element becomes greater than 0, a light flux subjected to the refracting power emerges from the aberration-correcting element as convergent light.

When the refractive index of the aberration-correcting element is lowered by a rise in ambient temperature, a degree of convergence of a light flux emerging from the aberration-correcting element turns out to be smaller, compared with that before a decline of the refractive index, because refracting power of the aberration-correcting element becomes smaller. Since this is equivalent to a change of the magnification of the converging lens in the direction to become smaller caused by a rise of ambient temperature, this magnification change causes spherical aberration to be changed in the direction of insufficient correction on the converging lens. It is therefore possible to offset spherical aberration that is changed in the direction to the excessive correction by a fall of the refractive index of the converging lens caused by a rise of ambient temperature.

As explained above, an amount of correction of temperature characteristics of the converging lens by the optical path difference generating structure can be reduced, and thereby, the number of ring-shaped zones can be reduced, and a width of a ring-shaped zone in the direction perpendicular to the optical axis can be made large, resulting in the effect that time required for making a die can be reduced, and transferability of the optical path difference generating structure onto a plastic material in the course of injection molding can be improved.

As stated above, in the objective optical system 30 shown in the present embodiment, temperature characteristics can be corrected by optical path difference generating structure 60 by using diffractive structure 70 for correcting chromatic aberration and by using optical path difference generating structure 60 for correcting temperature characteristics, even in the case where a refractive index only is changed by changes of ambient temperature, and a wavelength of the emerging light flux remains unchanged.

Further, since the aberration-correcting element 40 and the converging lens 50 both constituting the objective optical system 30 are made of plastic, it is possible to realize weight reduction of objective optical system 30 with high NA used for high density optical disk 20 and to manufacture them at low cost through injection molding employing a die. Further, by arranging so that only converging lens arranged to be closer to an optical disk may have refracting power for an incident light flux, it is possible to secure a large working distance and thereby to prevent an interference between the objective lens and an optical disk. It is further possible to control a rate of light fluxes whose courses are blocked and thereby do not contribute to forming of a convergent spot, among light fluxes entering the diffractive structure and the optical path difference generating structure, and it is possible to prevent a decline of an amount of light, because a structure having microscopic steps such as the diffractive structure or the optical path difference generating structure is formed on the optical surface of the aberration-correcting element.

It is further possible to control a rate of light fluxes whose courses are blocked and thereby do not contribute to forming of a convergent spot, among light fluxes entering the optical path difference generating structure 60 and the diffractive structure 70 and to prevent a decline of an amount of light, compared with an occasion where the optical path difference generating structure 60 and the diffractive structure 70 are formed on a spherical surface, because the optical path difference generating structure 60 and the diffractive structure 70 are formed on a plane (plane of incidence 41 and plane of emergence 42 of aberration-correcting element 40).

Incidentally, a member (joining member) capable of connecting aberration-correcting element 40 and converging lens 50 solidly may also be used without providing flange portions 43 and 53, though an illustration is omitted.

Further, by combining a rotary driving device that holds optical disk 20 rotatably and a control device that controls driving of various types of devices with the aforementioned optical pickup apparatus 10, it is possible to obtain an optical information recording and reproducing apparatus capable of conducting at least one of recording of information for optical disk 20 and reproducing of information recorded on optical disk 20, although an illustration for the foregoing is omitted.

Though the optical pickup apparatus 10 is provided with one laser light source 11 and is used for an optical disk (high density optical disk 20 in the present embodiment) with a single type of standard (or recording density) in the present embodiment, the invention is not limited to this, and an optical pickup apparatus having two or more light sources and having interchangeability for optical disks of two or more standards may also be used.

There will be explained as follows two types of diffractive structures which are preferable as diffractive structure 70 of aberration-correcting element 40, for the optical pickup apparatus having two or more light sources and having interchangeability for optical disks of two or more types of standards.

One of them is to design a depth of a step of diffractive structure 70 in the optical axis direction so that diffraction orders of diffracted rays of light generated may be different each other for incident light flux with wavelength λ1 and incident light flux with wavelength λ2 (λ2 >λ3). Due to this, optimum correction of chromatic aberration can be carried out for each wavelength area, and sufficient diffraction efficiency can be obtained for each wavelength area.

The other one is to make the diffractive structure 70 to be of a structure having wavelength selectivity to give an optical path difference to one and to give no optical path difference to the other substantially, among incident light flux with wavelength λ1 and incident light flux with wavelength λ2 (λ2≦λ3).

Specifically, as shown in FIGS. 4(a) and 4(b), diffractive structure 80 is composed of plural ring-shaped zones 81 each having its center on optical axis L and of step-shaped surface of discontinuity 82 formed on the ring-shaped zones 81 to be in parallel with the direction of optical axis L. Incidentally, in FIG. 4, there is indicated an occasion where the diffractive structure 80 is formed on plane of incidence 41 of aberration-correcting element 40. Ring-shaped zones 81 represent a serrated surface of discontinuity having a substantial inclination on optical surface S having prescribed form that is rotary symmetry about optical axis L, and further, step-shaped surface of discontinuity 82 for giving a prescribed optical path difference to the light flux passing through the ring-shaped zones 81 is formed on the optical surface of each ring-shaped zone 81 to be in parallel with the direction of optical axis L. In this case, the optical surface S having a prescribed form may be either a spherical surface or an aspheric surface. It may further be an optical surface where paraxial refracting power is 0, or an optical surface where paraxial refracting power is not 0.

Depth d1 (length in the direction of optical axis L) of each discontinuous surface 82 is substantially equal to the value expressed by $j \times \lambda/(n-1)$ when n represents a refractive index for the light flux having prescribed wavelength λ, and it is designed to be the length which generates an optical path difference corresponding substantially to one wavelength (λ) between a light flux with wavelength λ passing through one discontinuous surface 82 and a light flux with wavelength λ passing through discontinuous surface 82 that adjoins the aforesaid discontinuous surface 82, and generates no deviation of the wavefront.

Further, the form of each discontinuous surface 82 approximates a form wherein a form of the surface of serrated ring-shaped zones 81 shown with two-dot chain lines in FIG. 4 is divided by the section corresponding to each discontinuous surface 82, and is moved to be in parallel with the direction of optical axis L.

When the diffractive structure is of the construction stated above, an optical path difference is given only to the light flux on one side, among incident light flux with wavelength λ1 and incident light flux with wavelength λ2 (λ2 >λ3), and therefore, spherical aberration changes generated by a difference of protective layer thickness between optical disks each having a different standard can be corrected, chromatic aberration in the violet area can be corrected, and temperature characteristics in the violet area can be corrected.

Further, optical path difference generating structure 60 may be formed on the side of plane of emergence 42 of aberration-correcting element 40, and diffractive structure 70 may be formed on the side of plane of incidence 41 of aberration-correcting element 40. In this case, a light flux that is subjected to diffracting actions on the plane of emergence 42 emerges from the position that is away (distant) from optical axis L on the plane of emergence 42, and it emerges from the position that is away from optical axis L also on the plane of emergence 52 of converging lens 50, and therefore, the distance (working distance) from plane of emergence 52 of converging lens 50 to the surface of the optical disk 20 can be made long, and it is possible to prevent in advance the situation that the surface of optical disk 20 interferes with plane of emergence 52 of converging lens 50 when optical pickup apparatus 10 is driven.

It is also possible to form the optical path difference generating structure 60 and the diffractive structure 70 on the same optical surface of the aberration-correcting element 40.

Or, the diffractive structure 70 may be formed on the aberration-correcting element 40, and the optical path difference generating structure 60 may be formed on the converging lens 50. When spherical aberration is generated by ambient temperature changes on the light flux passing through the optical path difference generating structure 60, and the aberration-correcting element 40 and the converging lens 50 are incorporated under the state of axis deviation, in general, the light flux enters the converging lens 50 under the condition of occurrence of spherical aberration, and the light flux emerging from the converging lens 50 causes coma on a convergent spot. However, if the optical path difference generating structure 60 is formed on the converging lens 50, it is possible to prevent occurrence of coma, even in the case where the aberration-correcting element 40 and the converging lens 50 are incorporated under the state of axis deviation.

EXAMPLES OF THE INVENTION

Next, examples of the objective optical system stated above will be explained.

Example 1

The objective optical system in the present example is established to have focal length f=1.76 mm, paraxial power PT=0.569 mm$^{-1}$, numerical aperture NA=0.85, designed wavelength λ=405 nm and designed standard temperature T=25° C.

An aberration-correcting element is a plastic lens wherein both sides are flat, and an optical path difference generating structure is formed on the first surface (surface of incidence) and a diffractive structure (diffractive ring-shaped zones are in a saw-tooth shape) is formed on the second surface (surface of emergence). Further, it is established to have paraxial power (sum of the refractive power $P_R$ and diffractive power $P_D$) $P_1$=0.05 mm$^{-1}$, paraxial refractive power $P_R$=0 mm$^{-1}$, paraxial diffractive power $P_D$=0.05 mm$^{-1}$, ring-shaped zone width $P_f$ at the maximum effective diameter position=5.4 μm, ring-shaped zone width $P_h$ at the position of 50% of the maximum effective diameter=10.8 μm, wavefront aberration (405 nm, 25° C.) for individual aberration-correcting element=0.014 λrms, paraxial power $P_M$ for light flux with λ=405 nm: 0.05 mm$^{-1}$, paraxial power $P_L$ for light flux with λ=410 nm: 0.0507 mm$^{-1}$, paraxial power $P_s$ for light flux with λ=400 nm: 0.0494 mm$^{-1}$, and a rate of change of refractive index caused by temperature changes=−9.0×E−5.

Further, the converging lens is a plastic lens where both sides (the third surface and the fourth surface) are aspheric surfaces, and it is established to have focal length=1.89 mm, magnification m=0.088, numerical aperture NA=0.85, wavefront aberration (405 nm, 25° C.) for individual converging lens=0.000 λrms and a rate of change of refractive index caused by temperature changes=−10.8×E−5.

Table 1 shows radius of curvature r, position d in the direction of optical axis L from $i^{th}$ surface to $(i+1)^{th}$ surface and refractive index N for a light flux having a wavelength shown with a suffix for each of the aberration-correcting element and the converging lens.

TABLE 1

Paraxial data

| Surface No. | r (mm) | d (mm) | $N_{405}$ | $N_{406}$ | $N_{406.5}$ | Remarks |
|---|---|---|---|---|---|---|
| 0 | | ∞ | | | | Light source |
| 1 | ∞ | 0.80000 | 1.52469 | 1.52454 | 1.52447 | Aberration-correcting element |
| 2 | ∞ | 0.05000 | | | | |
| 3 | 1.16114 | 1.94000 | 1.56013 | 1.55997 | 1.55989 | Converging lens |
| 4 | −4.94428 | 0.52991 | | | | |
| 5 | ∞ | 0.10000 | 1.62000 | 1.62000 | 1.62000 | Protective layer |
| 6 | ∞ | | | | | |

An aspheric surface of the converging lens is expressed by an expression wherein coefficients in Table 2 are substituted in the following Numeral 1, when X (mm) represents an amount of deformation from a plane that is tangent to the aspheric surface at its vertex, h (mm) represents a height in the direction perpendicular to the optical axis and r (mm) represents a radius of curvature, in which κ represents a conic constant and $A_{2i}$ represents an aspheric surface coefficient.

$$X = \frac{h^2/r_i}{1 + \sqrt{1 - (1+k)h^2/r^2}} + \sum_{i=2} A_{2i} h^{2i}$$ (Numeral 1)

TABLE 2

Aspheric surface coefficient

| | Third surface | Fourth surface |
|---|---|---|
| κ | −6.5377E−01 | −3.4143E+02 |
| A4 | 2.4478E−02 | 1.8658E−01 |
| A6 | 7.3107E−03 | −2.9601E−01 |
| A8 | 2.0969E−03 | 4.3471E−01 |
| A10 | 1.2190E−03 | −5.1167E−01 |
| A12 | 8.8826E−04 | 3.4609E−01 |

TABLE 2-continued

Aspheric surface coefficient

| | Third surface | Fourth surface |
|---|---|---|
| A14 | −5.3723E−04 | −9.5672E−02 |
| A16 | −7.4897E−05 | 0.0000E+00 |
| A18 | 2.9543E−04 | 0.0000E+00 |
| A20 | −6.5694E−05 | 0.0000E+00 |

A diffractive structure of the aberration-correcting element is expressed by an optical path difference that is added to a transmission wavefront by the diffractive structure. The optical path difference of this kind is expressed by an expression wherein a coefficient in Table 3 is substituted for optical path difference function $\Phi_b$ (mm) that is defined by the following Numeral 2, when h (mm) represents a height in the direction perpendicular to the optical axis and $b_{2j}$ represents a coefficient of the optical path difference function.

$$\Phi_b = \sum_{j=0} b_{2j} h^{2j}$$ (Numeral 2)

TABLE 3

Coefficient of optical path difference function

| | Second surface |
|---|---|
| b2 | −2.5017E−02 |

Table 4 shows a form of each ring-shaped zone of the optical path difference generating structure.

TABLE 4

Optical path difference generating structure

| i | $h_{i-1}$ (mm) | $h_i$ (mm) | $m_i d$ (μm) | $m_i$ |
|---|---|---|---|---|
| 1 | 0.000 | 0.420 | 0.00 | 0 |
| 2 | 0.420 | 0.600 | 3.86 | 5 |
| 3 | 0.600 | 0.760 | 7.72 | 10 |
| 4 | 0.760 | 0.920 | 11.58 | 15 |
| 5 | 0.920 | 1.320 | 15.44 | 20 |
| 6 | 1.320 | 1.380 | 11.58 | 15 |
| 7 | 1.380 | 1.420 | 7.72 | 10 |
| 8 | 1.420 | 1.450 | 3.86 | 5 |
| 9 | 1.450 | 1.475 | 0.00 | 0 |
| 10 | 1.475 | 1.515 | −3.86 | −5 |

The symbol i in Table 4 expresses a central region of thee optical path difference generating structure and a number of each ring-shaped zone, and i=1 represents the central region including the optical axis, i=2 represents a ring-shaped zone adjoining the outer side (in the direction for moving away from the optical axis) of the central region, i=3 represents a ring-shaped zone adjoining the further outer side. Namely, on the aberration-correcting element of the objective optical system in the present example, there are formed nine ring-shaped zones outside the central region. The symbols hi−1 and hi respectively show a starting point height and an end point for each of the central region and each ring-shaped zone. A distance in the direction of the optical axis from each ring-shaped zone to the central region (a sign of the distance is positive for the displacement from the light source to an optical disk) is represented by mid. For example, the ring-shaped zone adjoining the outer side of the central region (i=2) is displaced by 3.86 μm from the central region toward the optical disk side, and the ring-shaped zone on the outermost side (i=10) is displaced by 3.86 μm from the central region toward the optical disk side. Further, mi represents an optical path difference to be given to the light flux transmitted through each ring-shaped zone for the light flux transmitted through the central region at design standard temperature T=25° C., and, for example, a light flux transmitted through the ring-shaped zone (i=2, m=5) that adjoins the outer side of the central region is delayed in terms of phase by 2π×5 (rad) in conversion into a phase difference, because an optical path difference of 5λ (λ=405 nm) is given to the light flux transmitted through the central region, while, a light flux transmitted through the outermost ring-shaped zone (i=10, m=−5) is advanced in terms of phase by 2π×5 (rad) in conversion into a phase difference, because an optical path difference of −5λ (λ=405 nm) is given to the light flux transmitted through the central region.

Figure 5:
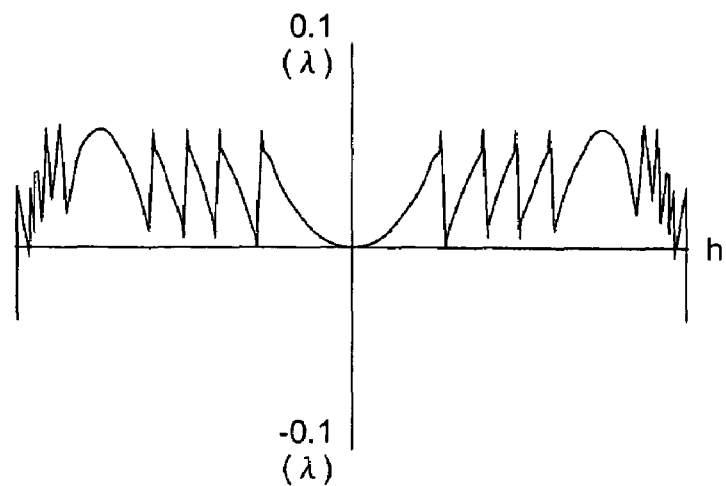
FIG. 5 is a graph showing relationship between wavefront aberration and a height from an optical axis in the example.
Figure 6:
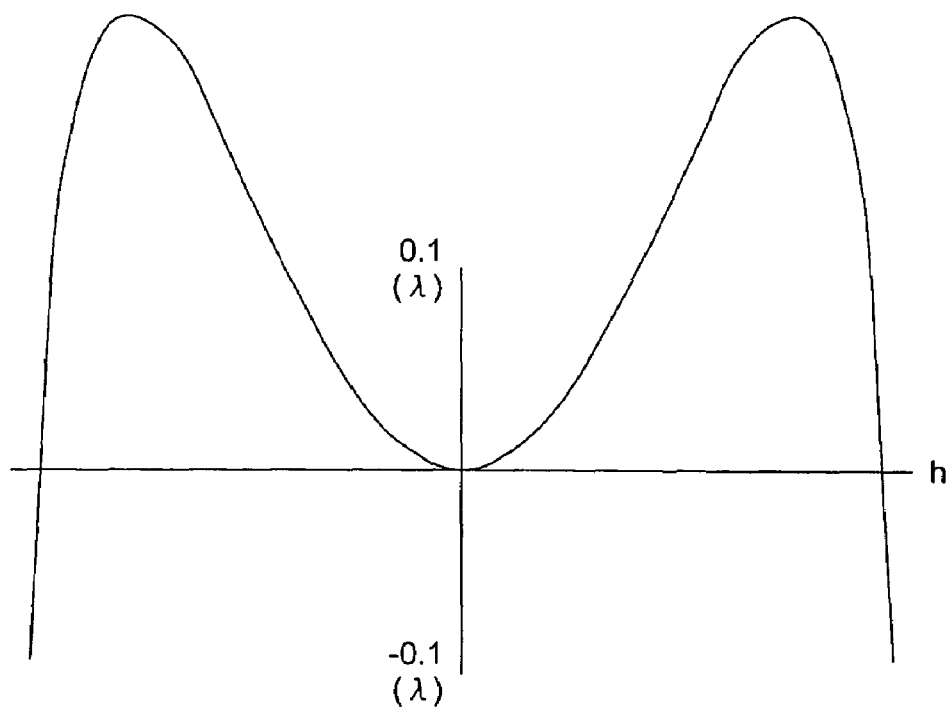
FIG. 6 is a graph of the comparative example. showing

FIG. 5 shows wavefront aberration in the case where temperature of the objective lens in the present example is enhanced to 55° C. from 25° C. that is a design standard temperature, by the ambient temperature changes, in which the axis of abscissas represents pupil coordinates h and the axis of ordinates represents wavefront aberration (unit is λ) FIG. 6 shows wavefront aberration in the case of evaluation by a converging lens alone.

At 55° C., a value in a unit of rms of wavefront was 0.075 λrms for a converging lens alone, while, it was 0.010 λrms for the combination of the converging lens and an aberration-correcting element. In FIG. 5 and FIG. 6, wavelength changes of violet semiconductor laser caused by temperature changes are also taken into consideration, and a rate of changes thereof was assumed to be +0.05 nm/° C.

When wavelength changes of violet semiconductor laser caused by temperature changes were not taken into consideration, namely, when the converging lens and a rate of change of refractive index of the aberration-correcting element only were considered, a value in a unit of rms of wavefront was 0.070 λrms for a converging lens alone, while, it was 0.022 λrms for the combination of the converging lens and an aberration-correcting element, at 55° C.

Due to this, it is understood that the objective lens of the invention is an optical element that is excellent in temperature characteristics despite a plastic single lens with NA 0.85 used, and the objective lens has an excellent effect of correction of temperature characteristics in the presence or absence of wavelength changes of the violet semiconductor laser caused by temperature rise, because an optical path difference generating structure is used for correction of temperature characteristics, in particular.

Figure 7:
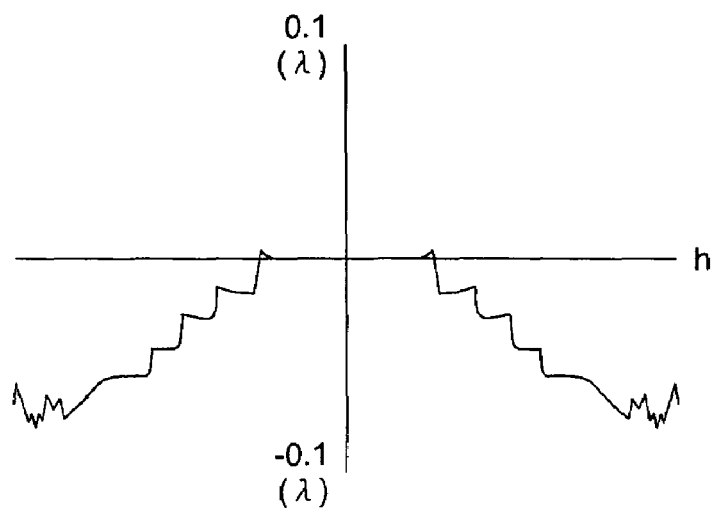
FIG. 7 is a graph showing relationship between wavefront aberration and a height from an optical axis in the example.
Figure 8:
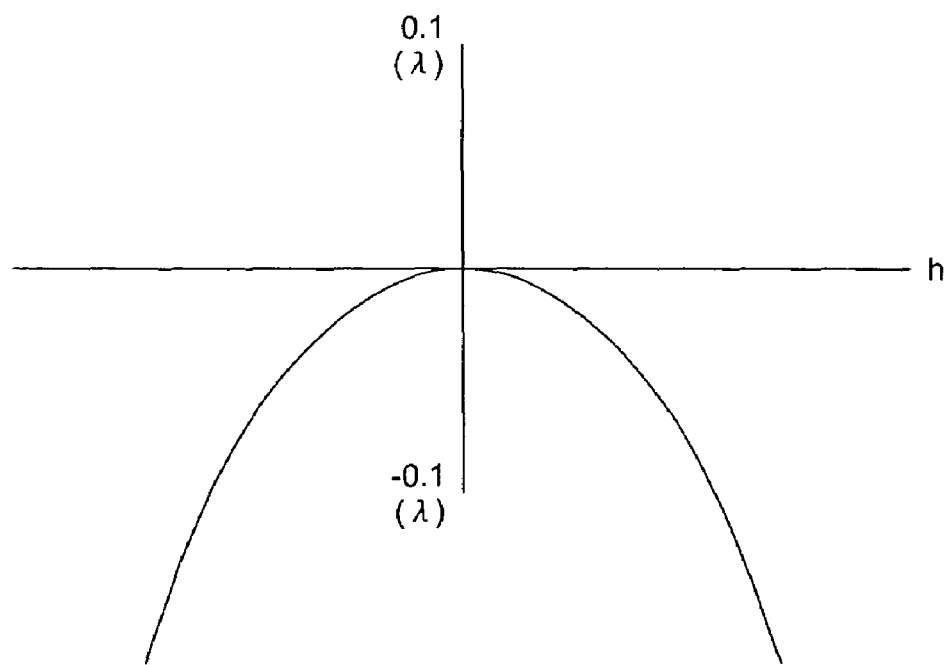
FIG. 8 is a graph of the comparative example.

FIG. 7 shows wavefront aberration in the case where a wavelength of an incident light flux for the objective lens in the present example is increased by 1 nm from design wavelength 405 nm by mode hopping of the violet semiconductor laser, in which the axis of abscissas represents pupil coordinates h and the axis of ordinates represents wavefront aberration (unit is λ). FIG. 8 shows wavefront aberration in the case of evaluation by a converging lens alone.

At wavelength 406 nm, a value in a unit of rms of wavefront aberration was 0.112 λrms for a converging lens alone, while, it was 0.022 λrms for the combination of the converging lens and an aberration-correcting element. In FIG. 7 and FIG. 8, a focusing position for each of an objective optical system and a converging lens is fixed at the focusing position at 405 nm.

Owing to this, it is understood that chromatic aberration is corrected properly by actions of the diffractive structure in the objective lens of the invention.

Example 2

The objective optical system in the present example is established to have focal length f=1.00 mm, paraxial power $PT=1.002$ mm$^{-1}$, numerical aperture NA=0.85, designed wavelength λ=408 nm and design standard temperature T=35° C.

The aberration-correcting element is a plastic lens wherein the first surface (surface of incidence) is flat and the second surface (surface of emergence) is aspherical, and an optical path difference generating structure is formed on the first surface and a diffractive structure (diffractive ring-shaped zones are in a saw-tooth shape) is formed on the second surface. Further, the aberration-correcting element is configured to have paraxial power $P_1$=0.116 mm$^{-1}$, paraxial refractive power $P_R$=0.051 mm$^{-1}$, paraxial diffractive power $P_D$=0.064 mm$^{-1}$, ring-shaped zone width $P_f$ at the maximum effective diameter position =12.2 μm, ring shaped zone width $P_h$ at the position of 50% of the maximum effective diameter=53.8 μm, wavefront aberration (408 nm, 35° C.) for individual aberration-correcting element=0.003 λrms, paraxial power $P_M$ for light flux with λ=408 nm: 0.1156 mm$^{-1}$, paraxial power $P_L$ for light flux with λ=413 nm: 0.1163 mm$^{-1}$, paraxial power $P_S$ for light flux with $_1$=403 nm: 0.1149 mm$^{-1}$, and a rate of change of refractive index caused by temperature changes =−1.0×E−4.

Further, the converging lens is a plastic lens where both side (the third surface and the fourth surface) are aspheric surfaces, and the converging lens is configured to have focal length=1.09 mm, magnification m=0.115, numerical aperture NA=0.85, wavefront aberration (408 nm, 35° C.) for individual converging lens=0.001 λrms, and a rate of change of refractive index caused by temperature changes=−1.0×E−4.

Table 5 shows the paraxial data of the aberration-correcting element and the converging lens.

TABLE 5

| | Paraxial data | | | | |
|---|---|---|---|---|---|
| Surface No. | r (mm) | d (mm) | $N_{408}$ | $N_{409}$ | $N_{409.5}$ | Remarks |
| OBJ | | ∞ | | | | Light source |
| 1 | ∞ | 0.77000 | 1.52317 | 1.52302 | 1.52294 | Aberration- |
| 2 | −10.21118 | 0.09000 | | | | correcting element |
| 3 | 0.63727 | 1.09000 | 1.52317 | 1.52302 | 1.52294 | Converging |
| 4 | −2.30817 | 0.27132 | | | | lens |
| 5 | ∞ | 0.08750 | 1.61830 | 1.61791 | 1.61771 | Protective |
| 6 | ∞ | | | | | layer |

Aspheric surfaces of the converging lens and the aberration-correcting element is expressed by an expression wherein in coefficients in Table 6 are substituted in the above-mentioned Numeral 1. In the aspheric structure of the second surface, the deformation amount the second surface from a spherical surface having a curvature radius of r becomes greater as a distance from the optical axis L in the direction perpendicular to the optical axis L becomes longer.

TABLE 6

Aspheric surface coefficient

|  | Second surface | Third surface | Fourth surface |
|---|---|---|---|
| κ | 1.0000E+01 | −6.4366E−01 | −1.0588E+02 |
| A4 | 3.4622E−02 | 1.3543E−01 | 1.5996E+00 |
| A6 | −8.2847E−04 | 2.2580E−01 | −1.0121E+01 |
| A8 | −8.7946E−03 | −4.7255E−02 | 4.5415E+01 |
| A10 | 3.4517E−02 | 2.8633E−01 | −1.3266E+02 |
| A12 | 5.7785E−03 | 1.7620E+00 | 2.1333E+02 |
| A14 | 0.0000E+00 | −1.7158E+00 | −1.3948E+02 |
| A16 | 0.0000E+00 | −4.7530E+00 | 0.0000E+00 |
| A18 | 0.0000E+00 | 1.1552E+01 | 0.0000E+00 |
| A20 | 0.0000E+00 | −3.5167E+00 | 0.0000E+00 |

A diffractive structure of the aberration-correcting element is expressed by an optical path difference that is added to a transmission wavefront by the diffractive structure. The optical path difference of this kind is expressed by the optical path difference function $\Phi_b$ (mm) that is defined by the above-mentioned Numeral 2 substituted by the coefficients in the following Table 7.

TABLE 7

Coefficient of optical path difference function

|  | Second surface |
|---|---|
| b2 | −3.2104E−02 |
| b4 | −1.6626E−02 |
| b6 | −1.6149E−03 |
| b8 | 1.0073E−02 |
| b10 | −2.5033E−02 |

Further, the following Table 8 shows a form of each ring-shaped zone of the optical path difference generating structure.

TABLE 8

Optical path difference generating structure

| i | Hi − 1 (mm) | Hi (mm) | Mid (um) | M1 |
|---|---|---|---|---|
| 1 | 0.000 | 0.375 | 0.000 | 0 |
| 2 | 0.375 | 0.567 | 2.340 | 3 |
| 3 | 0.567 | 0.742 | 4.679 | 6 |
| 4 | 0.742 | 0.815 | 2.340 | 3 |
| 5 | 0.815 | 0.852 | 0.000 | 0 |
| 6 | 0.852 | 0.920 | −2.340 | −3 |

On the aberration-correction element of the objective optical system in the present example, there are formed six ring-shaped zones outside the central region. The symbol mi represents an optical path difference to be given to the light flux transmitted through each ring-shaped zone for the light flux transmitted through the central region at designed standard temperature T=35° C. For example, a light flux transmitted through the ring-shaped zone (i=2, m=3) that adjoins the outer side of the central region is delayed in terms of phase by 2π×3 (rad) in conversion into a phase difference, because an optical path difference of 3λ(λ=408 nm) is given to the light flux transmitted through the central region, while, a light flux transmitted through the outermost ring-shaped zone (i=6, m=−3) is advanced in terms of phase by 2π×3 (rad) in conversion into a phase difference, because an optical path difference of −3λ (λ=405 nm) is given to the light flux transmitted through the central region.

When the incident angle of the light flux is 0.5 degree as a field angle, an rms value of the coma aberration component of the wavefront was 0.009 λrms for a converging lens alone, while it was 0.003 λrms for the combination of the converging lens and the aberration-correcting element. It means that the optical system in the present example satisfies a sine condition by combining the converging lens and the aberration-correcting element.

At 65° C., an rms value rms of wavefront was 0.047 λrms for a converging lens alone, while, it was 0.006 λrms for the combination of the converging lens and an aberration-correcting element. Further, wavelength changes of violet semiconductor laser caused by temperature changes were also taken into consideration, and a rate of changes thereof was assumed to be +0.05 nm/° C.

Still further, when wavelength changes of violet semiconductor laser caused by temperature changes were not taken into consideration, namely, when the converging lens and a rate of change of refractive index of the aberration-correcting element only were considered, a value in a unit of rms of wavefront was 0.045 λrms for a converging lens alone, while, it was 0.014 λrms for the combination of the converging lens and an aberration-correcting element, at 65° C. Due to this, it is understood that the objective lens of the invention is an optical element that is excellent in temperature characteristics despite a plastic single lens with NA 0.85 used, and the objective lens has an excellent effect of correction of temperature characteristics in the presence or absence of wavelength changes of the violet semiconductor laser caused by temperature rise, because an optical path difference generating structure is used for correction of temperature characteristics, in particular.

At wavelength 409 nm, an rms value of wavefront aberration was 0.058 λrms for a converging lens alone, while, it was 0.006 λrms for the combination of the converging lens and an aberration-correcting element. Further, a focusing position for each of an objective optical system and a converging lens is fixed at the focusing position at 408 nm.

Owing to this, it is understood that chromatic aberration is corrected properly by actions of the diffractive structure in the objective lens of the invention.

Example 3

The objective optical system in the present example is established to have focal length f=1.76 mm, paraxial power PT=0.569 mm$^{-1}$, numerical aperture NA=0.85, designed wavelength λ=407.5 nm and designed standard temperature T=35° C.

The aberration-correcting element is a plastic lens wherein the first surface (surface of incidence) is flat and the second surface (surface of emergence) is aspherical, and an optical path difference generating structure is formed on the first surface and a diffractive structure (diffractive ring-shaped zones are in a saw-tooth shape) is formed on the second surface. Further, the aberration-correcting element is configured to have paraxial power $P_1$=0.065 mm$^{-1}$, paraxial refractive power $P_R$=0.026 mm$^{-1}$, paraxial diffractive power $P_D$=0.039 mm$^{-1}$, ring-shaped zone width $P_f$ at the maximum effective diameter position=11.2 μm, ring shaped zone width $P_h$ at the position of 50% of the maximum effective diameter=46.6 μm, wavefront aberration (407.5 nm, 35° C.) for individual aberration-correcting element=0.002 λrms, paraxial power $P_M$ for light flux with λ=407.5 nm: 0.0649 mm$^{-1}$, paraxial power $P_L$ for light flux with λ=412.5 nm: 0.0654 mm$^{-1}$, paraxial power $P_S$ for light flux with $_1$=402.5 nm: 0.0645 mm$^{-1}$, and a rate of change of refractive index caused by temperature changes=−1.0×E−4.

Further, the converging lens is a plastic lens where both side (the third surface and the fourth surface) are aspheric surfaces, and the converging lens is configured to have focal length=1.94 mm, magnification m=0.114, numerical aperture NA=0.85, wavefront aberration (407.5 nm, 35° C.) for individual converging lens=0.001 λrms, and a rate of change of refractive index caused by temperature changes=−1.0×E−4.

Table 9 shows the paraxial data of the aberration-correcting element and the converging lens.

TABLE 9

| Surface Number | r (mm) | d (mm) | N407.5 | N408.5 | N409 | Remarks |
|---|---|---|---|---|---|---|
| OBJ | | ∞ | | | | Light source |
| 1 | ∞ | 0.78000 | 1.52324 | 1.52309 | 1.52302 | Aberration correcting element |
| 2 | −19.82504 | 0.09000 | | | | |
| 3 | 1.12123 | 1.92000 | 1.52324 | 1.52309 | 1.52302 | Converging lens |
| 4 | −4.28584 | 0.52245 | | | | |
| 5 | ∞ | 0.08750 | 1.61849 | 1.61810 | 1.61791 | Protective layer |
| 6 | ∞ | | | | | |

Aspheric surfaces of the converging lens and the aberration-correcting element is expressed by an expression wherein coefficients in Table 10 are substituted in the above-mentioned Numeral 1. In the aspheric structure of the second surface, the deformation amount the second surface from a spherical surface having a curvature radius of r becomes greater as a distance from the optical axis L in the direction perpendicular to the optical axis L becomes longer.

TABLE 10

| | Aspheric surface coefficient | | |
|---|---|---|---|
| | Second surface | Third surface | Fourth surface |
| κ | −3.4870E+02 | −6.6367E−01 | −2.5550E+02 |
| A4 | 1.3942E−03 | 2.7240E−02 | 1.9888E−01 |
| A6 | 1.1756E−03 | 1.4464E−02 | −3.2288E−01 |
| A8 | −2.0311E−04 | −5.0013E−03 | 4.4145E−01 |
| A10 | 2.4377E−04 | 6.2378E−03 | −5.0338E−01 |
| A12 | 0.0000E+00 | 2.6184E−03 | 3.4492E−01 |
| A14 | 0.0000E+00 | −2.6366E−03 | −9.7785E−02 |
| A16 | 0.0000E+00 | −6.2089E−04 | 0.0000E+00 |
| A18 | 0.0000E+00 | 1.3763E−03 | 0.0000E+00 |
| A20 | 0.0000E+00 | −3.2978E−04 | 0.0000E+00 |

A diffractive structure of the aberration-correcting element is expressed by an optical path difference that is added to a transmission wavefront by the diffractive structure. The optical path difference of this kind is expressed by the optical path difference function $\Phi_b$ (mm) that is defined by the above-mentioned Numeral 2 substituted by the coefficients in the following Table 11.

TABLE 11

| Coefficient of optical path difference function | |
|---|---|
| | Second surface |
| b2 | −1.9261E−02 |
| b4 | −3.3986E−03 |
| b6 | 2.8132E−04 |

TABLE 11-continued

| Coefficient of optical path difference function | |
|---|---|
| | Second surface |
| b8 | −1.1614E−04 |
| b10 | −2.5940E−05 |

Further, the following Table 12 shows a form of each ring-shaped zone of the optical path difference generating structure.

TABLE 12

| i | Hi − 1 (mm) | Hi (mm) | Mid (um) | Mi |
|---|---|---|---|---|
| 1 | 0 | 0.495 | 0 | 0 |
| 2 | 0.495 | 0.757 | 3.12 | 4 |
| 3 | 0.757 | 0.991 | 6.23 | 8 |
| 4 | 0.991 | 1.303 | 9.35 | 12 |
| 5 | 1.303 | 1.415 | 6.23 | 8 |
| 6 | 1.415 | 1.451 | 3.12 | 4 |
| 7 | 1.451 | 1.507 | 0.00 | 0 |
| 8 | 1.507 | 1.800 | −3.12 | −4 |

On the aberration-correction element of the objective optical system in the present example, there are formed eight ring-shaped zones outside the central region. The symbol mi represents an optical path difference to be given to the light flux transmitted through each ring-shaped zone for the light flux transmitted through the central region at designed standard temperature T=35° C. For example, a light flux transmitted through the ring-shaped zone (i=2, m=4) that adjoins the outer side of the central region is delayed in terms of phase by 2π×3 (rad) in conversion into a phase difference, because an optical path difference of 4λ(λ=407.5 nm) is given to the light flux transmitted through the central region, while, a light flux transmitted through the outermost ring-shaped zone (i=8, m=−4) is advanced in terms of phase by 2π×4 (rad) in conversion into a phase difference, because an optical path difference of −4λ(λ=405 nm) is given to the light flux transmitted through the central region.

When the incident angle of the light flux is 0.5 degree as a field angle, an rms value of the coma aberration component of the wavefront was 0.016 λrms for a converging lens alone, while it was 0.005 λrms for the combination of the converging lens and the aberration-correcting element. It means that the optical system in the present example satisfies a sine condition by combining the converging lens and the aberration-correcting element.

At 65° C., an rms value rms of wavefront was 0.090 λrms for a converging lens alone, while, it was 0.009 λrms for the combination of the converging lens and an aberration-correcting element. Further, wavelength changes of violet semiconductor laser caused by temperature changes were also taken into consideration, and a rate of changes thereof was assumed to be +0.05 nm/° C.

Still further, when wavelength changes of violet semiconductor laser caused by temperature changes were not taken into consideration, namely, when the converging lens and a rate of change of refractive index of the aberration-correcting element only were considered, a value in a unit of rms of wavefront was 0.085 λrms for a converging lens alone, while, it was 0.027 λrms for the combination of the converging lens and an aberration-correcting element, at 65° C. Due to this, it is understood that the objective lens of the invention is an optical element that is excellent in temperature characteristics despite a plastic single lens with NA 0.85 used, and the objective lens has an excellent effect of correction of temperature characteristics in the presence or absence of wavelength changes of the violet semiconductor laser caused by temperature rise, because an optical path difference generating structure is used for correction of temperature characteristics, in particular.

At wavelength 408.5 nm, an rms value of wavefront aberration was 0.109 λrms for a converging lens alone, while, it was 0.011 λrms for the combination of the converging lens and an aberration-correcting element. Further, a focusing position for each of an objective optical system and a converging lens is fixed at the focusing position at 407.5 nm.

Owing to this, it is understood that chromatic aberration is corrected properly by actions of the diffractive structure in the objective lens of the invention.

EFFECTS OF THE INVENTION

The invention makes it possible to obtain an optical system for an optical pickup apparatus wherein a weight is light and a sufficient working distance can be secured, and temperature characteristics and chromatic aberration can be corrected, an optical pickup apparatus, an optical system for an optical pickup apparatus, which is excellent especially in correction of temperature characteristics, an aberration-correcting element usable in the above-mentioned optical system and to provide an optical pickup apparatus utilizing the optical system and an optical information recording and/or reproducing apparatus utilizing the optical pickup apparatus.

What is claimed is:

1. An optical system for an optical pickup apparatus comprising:
   an aberration-correcting element being made of a plastic material, wherein the aberration-correcting element includes a first optical surface having an optical path difference generating structure on the first optical surface and includes a second optical surface having a diffractive structure on the second optical surface; and
   a converging lens to converge a light flux emitted from the aberration-correcting element, the converging lens being made of a plastic material, wherein the converging lens is a single refractive lens and has at least an aspherical surface,
   wherein a paraxial refractive power of the first optical surface of the aberration-correcting element is zero.

2. An optical system for an optical pickup apparatus comprising:
   an aberration-correcting element being made of a plastic material, wherein the aberration-correcting element includes a first optical surface having an optical path difference generating structure on the first optical surface and includes a second optical surface having a diffractive structure on the second optical surface; and
   a converging lens to converge a light flux emitted from the aberration-correcting element, the converging lens being made of a plastic material, wherein the converging lens is a single refractive lens and has at least an aspherical surface,
   wherein a paraxial refractive power of the second optical surface of the aberration-correcting element is zero.

3. An optical system for an optical pickup apparatus comprising:
   an aberration-correcting element being made of a plastic material, wherein the aberration-correcting element includes a first optical surface having an optical path difference generating structure on the first optical sur-
face and includes a second optical surface having a diffractive structure on the second optical surface; and
   a converging lens to converge a light flux emitted from the aberration-correcting element, the converging lens being made of a plastic material, wherein the converging lens is a single refractive lens and has at least an aspherical surface,
   wherein the optical path difference generating structure has a central region including an optical axis of the aberration-correcting element and has an outer region at the outer side of the central region, the outer region including a plurality of ring-shaped zones divided by steps, and
   at a first area of the outer region corresponding to an area from a periphery of the central region to a position of approximately 75% of a maximum effective diameter of the aberration-correcting element from the optical axis, an $(i+1)^{th}$ ring-shaped zone from the optical axis side is displaced in a direction parallel to the optical axis so that an optical path length of the $(i+1)^{th}$ ring-shaped zone becomes shorter than an optical path length of an $i^{th}$ ring-shaped zone, i represents an integer;
   at a second area of the outer region corresponding to an area from the position of approximately 75% of the maximum effective diameter to the maximum effective diameter, a $(j+1)^{th}$ ring-shaped zone from the optical axis side is displaced in a direction parallel to the optical axis so that an optical path length of the $(j+1)^{th}$ ring-shaped zone is longer than an optical path length of a $j^{th}$ ring-shaped zone, j represents an integer; and
   an optical path length of a ring-shaped zone at the position of approximately 75% of the maximum effective diameter from the optical axis is shorter than each of optical path lengths of ring-shaped zone adjoining the ring-shaped zone at the point of approximately 75% of the maximum effective diameter from the optical axis.

4. An optical system for an optical pickup apparatus comprising:
   an aberration-correcting element being made of a plastic material, wherein the aberration-correcting element includes a first optical surface having an optical path difference generating structure on the first optical surface and includes a second optical surface having a diffractive structure on the second optical surface; and
   a converging lens to converge a light flux emitted from the aberration-correcting element, the converging lens being made of a plastic material, wherein the converging lens is a single refractive lens and has at least an aspherical surface,
   wherein when an optical path difference added to a wavefront passing through the diffractive structure is expressed by an optical path difference function $\Phi_b$ (mm) defined by $\Phi_b = b_2 * h^2 + b_4 * h^4 + b_6 * h^6 + \ldots$, a paraxial diffracting power $P_D$ (mm$^{-1}$) defined by $P_D = -2 * b_2$ and a paraxial combined power $P_T$ (mm$^{-1}$) obtained by combining the aberration-correcting element and the converging lens satisfy the following expression (3);

$$0.03 \leq P_D/P_T \leq 0.15 \tag{3}$$

wherein h represents a height (mm) from the optical axis, and each of $b_2, b_4, b_6, \ldots$ represents a coefficient of optical path difference function for each of $2^{nd}$ order, $4^{th}$ order, $6^{th}$ order.

5. An optical system for an optical pickup apparatus comprising:
   an aberration-correcting element being made of a plastic material, wherein the aberration-correcting element includes a first optical surface having an optical path difference generating structure on the first optical surface and includes a second optical surface having a diffractive structure on the second optical surface; and a converging lens to converge a light flux emitted from the aberration-correcting element, the converging lens being made of a plastic material, wherein the converging lens is a single refractive lens and has at least an aspherical surface, wherein the diffractive structure corrects a variation of a spherical aberration generated on the converging lens due to a fluctuation in wavelength in an incident light flux, and wherein when an optical path difference added to a wavefront passing through the diffractive structure is expressed by an optical path difference function $\Box_b$ (mm) defined by $\Phi_b = b_2 * h^2 + b_4 * h^4 + b_6 * h^6 + \ldots$, at least one optical path difference function coefficient other than 2nd order becomes a value other than zero.

6. An optical system for an optical pickup apparatus comprising:

an aberration-correcting element being made of a plastic material, wherein the aberration-correcting element includes a first optical surface having an optical path difference generating structure on the first optical surface and includes a second optical surface having a diffractive structure on the second optical surface; and a converging lens to converge a light flux emitted from the aberration-correcting element, the converging lens being made of a plastic material, wherein the converging lens is a single refractive lens and has at least an aspherical surface, wherein the diffractive structure corrects a variation of a spherical aberration generated on the converging lens due to a fluctuation in wavelength in an incident light flux, and wherein the diffractive structure has a central region including an optical axis of the aberration-correcting element and an outer region at the outer side of the central region, the outer region including a plurality of ring-shaped zones divided by steps, and a width $P_f$ in a direction perpendicular to the optical axis (mm) of the ring-shaped zones positioned at a maximum effective diameter of the aberration-correcting element and width $P_h$ in a direction perpendicular to the optical axis (mm) of the ring-shaped zone at a position of 50% of the maximum effective diameter, satisfy the following expression (4);

$$0 < |P_h/P_f - 2| < 5 \quad (4).$$

7. An optical system for an optical pickup apparatus comprising:

an aberration-correcting element being made of a plastic material, wherein the aberration-correcting element includes a first optical surface having an optical path difference generating structure on the first optical surface and includes a second optical surface having a diffractive structure on the second optical surface; and a converging lens to converge a light flux emitted from the aberration-correcting element, the converging lens being made of a plastic material, wherein the converging lens is a single refractive lens and has at least an aspherical surface, wherein each of the aberration-correcting element and the converging lens includes an optical functional portion and a flange portion formed around the outer side of the optical functional portion, and a part of the flange portion of the aberration-correcting element and a part of the flange portion of the converging lens are bonded to each other.

8. An optical system for an optical pickup apparatus comprising:

an aberration-correcting element made of a plastic material, wherein the aberration-correcting element includes an optical surface having thereon an optical path difference generating structure; and a converging lens to converge a light flux emitted from the aberration-correcting element, the converging lens being made of a plastic material, wherein the converging lens is a single refractive lens having at least an aspherical surface, wherein a paraxial power $P_1$ (mm$^{-1}$) of the aberration-correcting element satisfies the following formula (1):

$$P_1 > 0 \quad (1),$$

wherein the optical path difference generating structure has a central region including an optical axis of the aberration-correcting element and has an outer region at the outer side of the central region, the outer region including a plurality of ring-shaped zones divided by steps, and at a first area of the outer region corresponding to an area from a periphery of the central region to a position of approximately 75% of a maximum effective diameter of the aberration-correcting element from the optical axis, an $(i+1)^{th}$ ring-shaped zone from the optical axis side is displaced in a direction parallel to the optical axis so that an optical path length of the $(i+1)^{th}$ ring-shaped zone becomes shorter than an optical path length of an $i^{th}$ ring-shaped zone, i represents an integer;

at a second area of the outer region corresponding to an area from the position of approximately 75% of the maximum effective diameter to the maximum effective diameter, a $(j+1)^{th}$ ring-shaped zone from the optical axis side is displaced in a direction parallel to the optical axis so that an optical path length of the $(j+1)^{th}$ ring-shaped zone is longer than an optical path length of a $j^{th}$ ring-shaped zone, j represents an integer; and an optical path length of a ring-shaped zone at the position of approximately 75% of the maximum effective diameter from the optical axis is shorter than each of optical path lengths of ring-shaped zone adjoining the ring-shaped zone at the point of approximately 75% of the maximum effective diameter from the optical axis.

9. An optical system for an optical pickup apparatus comprising:

an aberration-correcting element made of a plastic material, wherein the aberration-correcting element includes an optical surface having thereon an optical path difference generating structure; and a converging lens to converge a light flux emitted from the aberration-correcting element, the converging lens being made of a plastic material, wherein the converging lens is a single refractive lens having at least an aspherical surface, wherein a paraxial power $P_1$ (mm$^{-1}$) of the aberration-correcting element satisfies the following formula (1):

$$P_1 > 0 \quad (1),$$

wherein the aberration-correcting element further comprises at least an optical surface provided thereon a diffractive structure, wherein the diffractive structure corrects a longitudinal chromatic aberration generated at the converging lens due to a fluctuation in wavelength of an incident light flux, and wherein when an optical path difference added to a wavefront passing through the diffractive structure is expressed by an optical path difference function $\Phi_b$ (mm) defined by $\Phi_b = b_2 * h^2 + b_4 * h^4 + b_6 * h^6 + \ldots$, a paraxial diffracting power $P_D$ (mm$^{-1}$) defined by $P_D = -2*b_2$ and a paraxial combined power $P_T$ (mm$^{-1}$) obtained by combining the aberration-correcting element and the converging lens satisfy the following expression (3);

$$0.03 \leq P_D/P_T \leq 0.15 \quad (3)$$

wherein h represents a height (mm) from the optical axis, and each of $b_2, b_4, b_6, \ldots$ represents a coefficient of optical path difference function for each of $2^{nd}$ order, $4^{th}$ order, $6^{th}$ order.

10. An optical system for an optical pickup apparatus comprising:

an aberration-correcting element made of a plastic material, wherein the aberration-correcting element includes an optical surface having thereon an optical path difference generating structure; and a converging lens to converge a light flux emitted from the aberration-correcting element, the converging lens being made of a plastic material, wherein the converging lens is a single refractive lens having at least an aspherical surface, wherein a paraxial power $P_1$ (mm$^{-1}$) of the aberration-correcting element satisfies the following formula (1):

$$P_1 > 0 \quad (1),$$

wherein the aberration-correcting element further comprises at least an optical surface provided thereon a diffractive structure, wherein the diffractive structure corrects a variation of a spherical aberration generated at the converging lens due to a fluctuation in wavelength in an incident light flux, and wherein when an optical path difference added to a wavefront passing through the diffractive structure is expressed by an optical path difference function $\Phi_b$ (mm) defined by $\Phi_b = b_2 * h^2 + b_4 * h^4 + b_6 * h^6 + \ldots$, least one optical path difference function coefficient other than 2nd order becomes a value other than zero.

11. An optical system for an optical pickup apparatus comprising:

an aberration-correcting element made of a plastic material, wherein the aberration-correcting element includes an optical surface having thereon an optical path difference generating structure; and a converging lens to converge a light flux emitted from the aberration-correcting element, the converging lens being made of a plastic material, wherein the converging lens is a single refractive lens having at least an aspherical surface, wherein a paraxial power $P_1$ (mm$^{-1}$) of the aberration-correcting element satisfies the following formula (1):

$$P_1 > 0 \quad (1),$$

wherein the aberration-correcting element further comprises at least an optical surface provided thereon a diffractive structure, wherein the diffractive structure corrects a variation of a spherical aberration generated at the converging lens due to a fluctuation in wavelength in an incident light flux, and wherein the diffractive structure has a central region including an optical axis of the aberration-correcting element and an outer region at the outer side of the central region, the outer region including a plurality of ring-shaped zones divided by steps, and a width $P_f$ in a direction perpendicular to the optical axis (mm) of the ring-shaped zones positioned at a maximum effective diameter of the aberration-correcting element and width $P_h$ in a direction perpendicular to the optical axis (mm) of the ring-shaped zone at a position of 50% of the maximum effective diameter, satisfy the following expression (4);

$$0 < |P_h/P_f - 2| < 5 \quad (4).$$

12. An optical system for an optical pickup apparatus comprising:

an aberration-correcting element made of a plastic material, wherein the aberration-correcting element includes an optical surface having thereon an optical path difference generating structure; and a converging lens to converge a light flux emitted from the aberration-correcting element, the converging lens being made of a plastic material, wherein the converging lens is a single refractive lens having at least an aspherical surface, wherein a paraxial power $P_1$ (mm$^{-1}$) of the aberration-correcting element satisfies the following formula (1):

$$P_1 > 0 \quad (1),$$

wherein each of the aberration-correcting element and the converging lens includes an optical functional portion and a flange portion formed around the outer side of the optical functional portion, and a part of the flange portion of the aberration-correcting element and a part of the flange portion of the converging lens are bonded to each other.

* * * * *